(12) United States Patent
Shima et al.

(10) Patent No.: US 7,065,279 B2
(45) Date of Patent: Jun. 20, 2006

(54) METHOD FOR EXCITING LIGHT FOR OPTICAL AMPLIFICATION MEDIUM FIBER, STRUCTURE FOR EMITTING EXCITED LIGHT INTO OPTICAL AMPLIFICATION MEDIUM FIBER OPTICAL FIBER AMPLIFIER, AND OPTICAL FIBER LASER

(75) Inventors: Kensuke Shima, Sakura (JP); Tomoharu Kitabayashi, Sakura (JP); Tetsuya Sakai, Sakura (JP)

(73) Assignee: Fujikura Ltd., Tokyo (JP)

( * ) Notice: Subject to any disclaimer, the term of this patent is extended or adjusted under 35 U.S.C. 154(b) by 72 days.

(21) Appl. No.: 10/853,114

(22) Filed: May 26, 2004

(65) Prior Publication Data
US 2004/0240819 A1    Dec. 2, 2004

(30) Foreign Application Priority Data
May 28, 2003 (JP) .............................. 2003-151260
Jun. 24, 2003 (JP) .............................. 2003-179850

(51) Int. Cl.
*G02B 6/02* (2006.01)

(52) U.S. Cl. .............................. 385/123; 385/27; 372/6

(58) Field of Classification Search .................. 385/27, 385/30, 31, 49, 50, 88, 89, 123–128; 372/6
See application file for complete search history.

(56) References Cited

U.S. PATENT DOCUMENTS

| 3,712,705 A | 1/1973 | Marcatili |
| 3,902,879 A | 9/1975 | Siegmund |
| 4,630,889 A | 12/1986 | Hicks, Jr. |
| 6,370,297 B1 * | 4/2002 | Hakimi et al. ................ 385/27 |
| 2002/0181512 A1 | 12/2002 | Wang et al. |

FOREIGN PATENT DOCUMENTS

| EP | 0 905 834 A2 | 3/1999 |
| EP | 1 043 849 A2 | 10/2000 |
| JP | 2002-33536 | 1/2002 |
| WO | WO 02/27369 A1 | 4/2002 |
| WO | WO 03/010578 A1 | 2/2003 |
| WO | WO 03/019257 A1 | 3/2003 |
| WO | WO 03/079077 A1 | 9/2003 |

* cited by examiner

*Primary Examiner*—Phan Palmer
(74) *Attorney, Agent, or Firm*—Sughrue Mion, PLLC

(57) ABSTRACT

An inner cladding exposure section 14 is formed by removing a part of an outer cladding 4 of an optical amplification medium fiber 10 which has a porous layer 3 between the inner cladding 2 and the outer cladding 4 in a longitudinal direction. An end surface 23 of an optical fiber 20 for the excited light incidence is cemented on an outer periphery of the exposed inner cladding 2. The excited light 24 is incident into the optical amplification medium fiber 10 from the optical fiber 20 for the excited light incidence. By doing this, it is possible to provide a method for exciting a light in an optical amplification medium fiber which can realize a superior amplitude while emitting the excited light so as to be incident into the optical amplification medium fiber highly efficiently.

3 Claims, 16 Drawing Sheets

METHOD FOR EXCITING LIGHT FOR OPTICAL AMPLIFICATION MEDIUM FIBER, STRUCTURE FOR EMITTING EXCITED LIGHT INTO OPTICAL AMPLIFICATION MEDIUM FIBER OPTICAL FIBER AMPLIFIER, AND OPTICAL FIBER LASER

The present application claims priority from patent application No. 2003-151260 filed May 28, 2003 in Japan, and No. 2003-179850 filed Jun. 24, 2003, the content of which is incorporated herein by reference.

BACKGROUND OF THE INVENTION

1. Field of the Invention

The present invention relates to a method of exciting a light for an optical amplification medium fiber which is used in industrial area such as information communication, a laser medical operation, or a laser manufacturing operation; a structure for emitting an excited light into an optical amplification medium fiber; an optical fiber amplifier; and an optical fiber laser.

2. Description of Related Art

For a conventional type of the optical amplification medium fiber as shown in FIG. 12, there has been an optical amplification medium fiber which is provided with an inner cladding 102 around a core 101 into which a rare-earth element is doped, an outer cladding 104 which is disposed on an outer periphery of the inner cladding 102 via a porous layer 103, and a coating 105 thereon. In the porous layer 103, holes 106 and a connecting section 107 which connects the inner cladding 102 and the outer cladding 104 are formed alternately in a circular direction. (See "Jacketed air clad cladding pumped ytterbium-doped fiber laser with wide tuning range" by J. K. Sahu et al, Electronics Letters, Great Britain, 2001, Vol. 37, pages 1116–1117)

There is a large relative refractive index difference between the inner cladding 102 and the porous layer 103 in such an optical amplification medium fiber 110 which has a porous fiber structure. Therefore, it is possible to emit an excited light which has a large aperture number to be incident into the optical amplification medium fiber 110. Thus, there is an advantage in that it is possible to form an optical fiber laser which has a great output. If it is intended to emit the excited light into a side surface of the optical amplification medium fiber 110 so as to excite the optical amplification medium fiber optically, the excited light is dispersed by the porous layer 103. Therefore, efficient incidence cannot be realized; therefore, it is a common procedure in that the excited light is emitted into an end surface of the optical amplification medium fiber 110.

FIG. 13 is a general view for an example for a conventional method for exciting a optical amplification medium fiber optically. In such a method for exciting a light, an excited light 124 is emitted to be incident into the inner cladding 102 of the optical amplification medium fiber 110 by condensing a light of the excited light 124 which is emitted from a laser diode (source for an excited light) 126 on an end surface 111 of the optical amplification medium fiber 110 by a light condensing lens 127 so as to excite the rare-earth element which is doped into core 101 of the optical amplification medium fiber 110.

FIG. 14 is a general view for a first example for a conventional optical fiber amplifier. In such an optical fiber amplifier 140A, a signal light 143 which is output from an end surface 142 of an optical fiber 141 for incident signal light is condensed by the light condensing lens 144 so as to be incident into an end surface 111 of the optical amplification medium fiber 110 through a optical filter 145. Also, the excited light 124 is condensed by the light condensing lens 127 and reflected by the optical filter 145 so as to be incident into the end surface 111 of the optical amplification medium fiber 110. In the optical amplification medium fiber 110, the signal light is amplified by a rare-earth element which is excited by absorbing the excited light 124 so as to be output from an end surface 112 which is disposed opposite to the optical amplification medium fiber 110 as an output signal light 146.

FIG. 15 is a general view for a second example for a conventional optical fiber amplifier. An optical fiber amplifier 140B is provided with a plurality of laser diodes (source for excited light) 126, so as to enhance the intensity for the excited light 124 which is emitted to be incident into the optical amplification medium fiber 110. Consequently, the excited light 124 which is output from these excited light sources 126, 126 are mixed by an optical mixing element 128 which is formed by a silica glass member so as to emit the excited light 124 into an end surface 111 of the optical amplification medium fiber 110 via a light condensing lens 127 and an optical filter 145. By doing this, the optical amplifier 140B can realize more efficient amplitude than in a case in which a piece of excited light source.

FIG. 16 is a general view for a third example for a conventional optical fiber amplifier. In the optical fiber amplifier 140B, a plurality of optical amplifying medium fibers 110a, 110b, 110c are connected via light condensing lenses 144 and optical filters 145 for mixing the excited light 124 and the signal light 143, 147. That is, the signal light 143 which is output from an end surface 142 of the optical fiber 141 into which a signal light is emitted to be incident is emitted to be incident into a first optical amplification medium fiber 110a, a second optical amplification medium fiber 110b, and a third optical amplification medium fiber 110c successively and amplified. The signal light under condition of a space beam 147 is transmitted in a space among the optical amplification medium fibers 110a, 110b, and 110c so as to be mixed with the excited light; thus, the signal light is emitted to be incident into next optical amplification medium fibers 110b and 110c. By doing this, it is possible to obtain an output signal light 146 which has a greater intensity.

FIG. 17 is a general view for another example for a conventional method for exciting a optical amplification medium fiber optically. A so-called double cladding optical amplification medium fiber 210 which is used in this method is provided with a core 201, an inner cladding 202 which is formed by a silica glass member so as to be formed on an periphery of the core 201, and an outer cladding 203 which is formed on an outer periphery of the inner cladding 202. The outer cladding 203 is a resin coating of which refractive index is slightly lower than that in the inner cladding 202 (for example, the refractive index in the inner cladding 202 is 1.45 and the refractive index in the outer cladding 203 is 1.42). It is possible to realize a waveguide function in the inner cladding 202 by using such refractive index difference.

In this method for exciting the light, an outer cladding 203 of the optical amplification medium fiber 210 is removed in a part of a longitudinal direction. Furthermore, a part of an outer periphery of the inner cladding 202 which is exposed in a coating removed section 211 is ground so as to form a planar ground section 207. An end surface 208 of the optical fiber 220 for excited light incidence is cut diagonally so as to be connected to the ground section 207. Furthermore, a protective resin layer 214 is disposed so as to protect the connecting section 213 and the ground section 207.

According to such a method for exciting the light, the excited light 224 which is transmitted in the optical fiber 220 for excited light incidence is emitted from the connecting section 213 so as to be incident into the optical amplification medium fiber 210 for excited light incidence. Thus, a light is excited in the optical amplification medium fiber 210. (See English Specification for U.S. Pat. No. 6,370,297)

In the optical fiber amplifiers 140A to 140C which use the optical amplification medium fiber 110 which has the above porous fiber structure, it is necessary to emit the signal light 143, 147 and the excited light 124 so as to be incident into the optical amplification medium fiber 110 as a space beam; therefore, it is necessary to dispose an optical system such as a light condensing lens 144 and an optical filter 145. In addition, it is necessary to dispose the optical fiber 141 into which the signal light is emitted to be incident and the excited light source 126 in aligned condition simultaneously. Therefore, very delicate operations such as adjusting an alignment for an optical axis of a light is necessary. Also, even though the optical axis is adjusted desirably, there are problems in that an optical axis may be dis-aligned by a mechanical factors such as a vibration and collision or by a temperature condition; thus, a desirable amplification function may be disturbed.

Also, in a case in which a double-cladding optical amplification medium fiber 210 is used, there is a slight difference for the refractive index for the inner cladding 202 and the outer cladding 203. Therefore, only a component which has a small incidence angle θ in the excited light 224 which is emitted so as to be incident into the optical fiber 220 for excited light incidence can be transmitted in the optical amplification medium fiber 210. A component which has a large incidence angle θ in the excited light 224 leaks in a condition of light loss out of the optical fiber 210 via the outer cladding 203 from the inner cladding 202. That is, there is a problem in that efficiency for emitting the excited light 224 to be incident into the optical amplification medium fiber 210 is not enough; thus, the light loss is undesirably great.

Also, in recent years, optical fiber laser and amplifier have been studied which use a laser oscillation medium such as a silica glass member to which a rare-earth element such as erbium (Er), neodymium (Nd), ytterbium (Yb), and holmium (Ho) is doped and a host glass such as a fluoride glass member.

There is an advantage for an optical fiber laser in that it is possible to realize a small device highly efficiently such that the laser oscillation medium serve for a transmitting medium compatibly. The optical fiber laser is used for various industrial use such as an optical communication, an optical sensor, a material science, and medical science according to the above feature. In particular, a laser which has a higher output power is longed for industrial use such as an optical communication and a material science.

The realization of the higher output power depends on an introduction of the excited light into an area (normally a core is named for such an area) into which a laser activating medium (rare-earth ion) is doped in the optical fiber laser.

An area to which a laser activating medium is doped such as an outer diameter of the core may be approximately 10 µm for an optical fiber laser which is manufactured according to a common method in which the excited light is introduced into an end surface of the rare-earth doped fiber. Therefore, it is very difficult to introduce an excited light into the core efficiently. Also, if there is a dust on an end surface into which the excited light is emitted to be incident in the rare-earth-doped fiber, there is a concern that the end surface may be damaged by a heat.

A method is proposed for introducing the excited light into the core efficiently in which a double-cladding fiber is provided with a first cladding and a second cladding for the laser medium so as to introduce the excited light into an end surface of the double cladding fiber or the side of the double cladding fiber.

An optical fiber laser shown, for example, in FIG. 22 is used for a method in which the excited light is introduced into an end surface of the double cladding fiber.

In such an optical fiber laser, the excited light which is emitted from the excited laser diode module (hereinafter called an "excited LD module") 201 is condensed by the light condensing lenses 202, 203 so as to be introduced into an end surface of a rare-earth-doped optical fiber 205 via a resonator mirror 204; thus, a light which is emitted therefrom resonates in the resonator mirror 204. Accordingly, the resonating excited mirror is emitted from another end surface of the rare-earth-doped fiber 205 so as to be emitted thereoutside in a laser light condition via the resonator mirror 206.

The cross section of the first cladding of the rare-earth-doped fiber 205 is larger than a core in a non-double-cladding optical fiber; therefore, it is possible to introduce more amount of the excited light into the fiber. Therefore, it is possible to realize a higher output power in the optical fiber laser.

In such a method for introducing the excited light into a side of the double-cladding fiber, for example, a plurality of optical fibers are bundled and the excited light is emitted from a periphery of a structure which is formed by optical medium unitarily. By doing this, an optical fiber laser for emitting the laser light from the end surface of the optical fiber is formed (See Japanese Unexamined Patent Application, First Publication No. Hei 10-190097).

The excited light is introduced into such an optical fiber laser from the side of a plurality of the optical fibers; therefore, an area into which the excited light is introduced can be enlarged greatly.

However, an intense excited light is still condensed on an end surface of the rare-earth-doped fiber according to a method in which the excited light is introduced into an end surface of the double-cladding fiber. Therefore, there is a concern that a section into which the excited light is introduced may be damaged by heat in the double-cladding fiber. If the section into which the excited light is introduced is damaged by a heat, the excited light is not introduced into the rare-earth-doped fiber; thus, the oscillation of the excited light stops in the rare-earth-doped fiber. Therefore, there is a problem that the laser light is not output.

On the other hand, the excited light is transmitted so as to cross a plurality of the optical fibers according to a method in which the excited light is introduced into a side of the double-cladding fiber. Therefore, a problem such as a diminished transmission of the excited light and a dispersion loss may occur in gaps among the optical fibers.

The optical fibers are embedded in an organic bonding agent in order to prevent such a diminished transmission and a dispersion loss. However, such an organic bonding agent has only a low optical power resistance. If the intensity of the excited light is enhanced for obtaining a higher output of the laser light, the organic bonding agent may be denatured; thus, it is not possible to realize a desirable transparency for the organic bonding agent. Accordingly, there may be a case in which the output power of the laser light be decrease extremely. Also, an entire structure which is formed by a plurality of the bundled optical fibers may be damaged by a heat; thus, there may be a case in which the laser light may not be output.

SUMMARY OF THE INVENTION

Accordingly, an object of the present invention is to provide a method for exciting a light in the optical amplification medium fiber in which the excited light can be emitted so as to be incident into the optical amplification medium fiber highly efficiently, a structure for emitting the excited light so as to be incident into the optical amplification medium fiber, and an optical fiber amplifier and an optical fiber laser which have a superior amplitude.

The present invention was made in consideration of the above problem. Another object of the present invention is provide an optical fiber laser in which an oscillation does not stop even if a part of the section into which the excited light is emitted from the excited light source so as to be incident may be damaged by a heat.

In order to solve the above problems, in the present invention, a method for exciting an optical amplification medium fiber which is provided with a core which a rare-earth element is doped, an inner cladding which is disposed on an outer periphery of the core, a porous layer which is formed on an outer periphery of the inner cladding, and an outer cladding which is disposed on outer periphery of the porous layer comprises removing a part of the outer cladding of the optical amplification medium fiber in a longitudinal direction, forming an inner cladding exposure section in which the inner cladding is exposed, cementing an end of an optical fiber for excited light incidence onto the outer periphery of the inner cladding which is exposed in the inner cladding exposure section, and emitting excitation light from the optical fiber for optical light incidence into an optical amplification medium fiber.

If the optical amplification medium fiber includes a coating around the outer cladding, the inner cladding exposure section can be formed by removing a part of the coating and the outer cladding in a longitudinal direction.

In a method for exciting the optical amplification medium fiber, a plurality of the inner cladding exposure sections are formed in the longitudinal direction of the optical amplification medium fiber, different ends of the optical fiber for exciting light incidence are cemented to the plurality of the inner cladding exposure sections. Thus, the excitation light is incident into the optical amplification medium fiber from the optical fiber for the excitation light incidence.

Also, the present invention provides a structure for emitting an excited light into an optical amplification medium fiber which is provided with a core into which a rare-earth element is doped, an inner cladding which is disposed on an outer periphery of the core, a porous layer which is formed on an outer periphery of the inner cladding, and an outer cladding which is disposed on outer periphery of the porous layer. In this aspect of the present invention, an inner cladding exposure section which is formed by removing a part of an outer cladding is removed in a longitudinal direction is formed in a longitudinal direction of the optical amplification medium fiber, and an end of the optical fiber for excited light incidence is cemented on an outer periphery of the inner cladding which is exposed in the inner cladding exposure section. If the optical amplification medium fiber includes a coating around the outer cladding, the inner cladding exposure section can be formed by removing a part of the coating and the outer cladding in a longitudinal direction.

In a structure for emitting an excited light into an optical amplification medium fiber, a plurality of the inner cladding exposure sections are formed in a longitudinal direction of the optical amplification medium fiber; a different ends of the optical fiber for exciting light incidence are cemented to the plurality of the inner cladding exposure sections.

Furthermore, the present invention provides an optical fiber amplifier and an optical fiber laser which are provided with a structure for emitting the excited light to be incident into the above optical amplification medium fiber.

Furthermore, the present invention is a structure for emitting an excited light to be incident into the optical amplification medium fiber such that the inner cladding has a multilateral cross section; the outer cladding has a circular cross section; and an outer edge line of the inner cladding is disposed so as to coincide with an inner surface of the outer cladding.

In order to solve the above problems, the present invention provides an optical fiber laser which comprises a rare-earth-ion-doped fiber which comprises a core which is formed by a glass member to which a rare-earth ion is doped, a first cladding which is formed around the core so as to transmit an excited light, and a second cladding which is disposed around the first cladding, and an excited laser diode module which emits the excited light to be incident into the rare-earth-ion-doped fiber. In this aspect of the present invention, the rare-earth-ion-doped fiber and the excited laser diode module are connected at least two guide fibers such that the excited light which is emitted from the laser diode module should be incident into the fist cladding.

In the optical fiber laser which has the above structure, an end of the guide fiber may be connected to a side surface of the rare-earth-ion-doped fiber.

In the optical fiber laser which has the above structure, an end of the guide fiber may be connected to an end surface of the rare-earth-ion-doped fiber.

In the optical fiber laser which has the above structure, an end of the guide fiber may be connected to the first cladding in an end surface of the rare-earth-ion-doped fiber in an optical fiber laser.

In the optical fiber laser which has the above structure, an ion in the rare-earth-element may be an erbium ion.

As explained above, according to the optical amplification medium fiber and a structure for emitting the excited light so as to be incident, it is possible to maintain the connection between the optical amplification medium fiber and the optical fiber for excited light incidence reliably such that an optical misalignment may not be caused by an external factors such as mechanical factor or a temperature condition. The optical fiber for excited light incidence can be cemented to the optical amplification medium fiber directly; thus, the light condensing lens is not necessary. Therefore, it is possible to reduce the number of the parts so as to reduce a manufacturing cost. In addition, it is possible to avoid a loss which is caused by the signal light which is transmitted in the space. In addition, an upper limit for an angle for an incidence for the excited light may be raised than that in a conventional case because of the porous layer; therefore it is possible to realize a highly more efficient incidence for the excited light from the optical fiber for excited light incidence to the optical amplification medium fiber.

Furthermore, in a case in which a plurality of the inner cladding exposure sections are formed on the optical amplification medium fiber in the longitudinal direction and end surfaces of the different optical fiber for excited light incidence are cemented to the plurality of the inner cladding exposure sections, it is possible to supply the excited light over an entire length of the optical amplification medium fiber even if the entire length of the optical amplification medium fiber is longer than the length of the diminishing excited light. Therefore, it is possible to supply the excited light from a plurality of the excited light sources to the optical amplification medium fiber; thus, it is possible to excite the optical amplification medium fiber more highly efficiently. Also, it is not necessary to extract the signal light in a space beam condition during its transmission; therefore, it is possible to reduce the loss in the signal light. Also, an optical mixing element is not necessary. Therefore, it is possible to reduce a manufacturing cost by reducing the number of the parts. In addition, it is possible to emit the excited light from the excited light source so as to be incident into the optical amplification medium fiber in a low loss.

According to the optical fiber amplifier according to the present invention, it is possible to realize an optical fiber amplifier which has a reliable amplitude and a reliability.

According to the optical fiber laser according to the present invention, it is possible to realize an optical fiber laser which has a high efficiency and a high intensity.

As explained above, a plurality of sections into which the excited light is introduced are disposed in the optical fiber laser of the present invention so as to introduce the excited light from the excited LD module to the rare-earth-ion-doped fiber. By doing this, even if one of these sections into which the excited light is introduced is damaged by a heat because of a dust under condition that other sections into which the excited light is introduced are not damaged by a heat, the oscillation of the excited light does not stop in the rare-earth-ion-doped fiber; thus, it is possible to output the laser light from the optical fiber laser for a long period.

Also, if any one of these sections into which the excited light is introduced is damaged by a heat, other sections into which the excited light is introduced are not disturbed by such a damage. Therefore, it is possible to reduce the diminished output of the laser light.

DETAILED DESCRIPTION OF THE INVENTION

Details for embodiments of the present invention are explained below.

Figure 1:
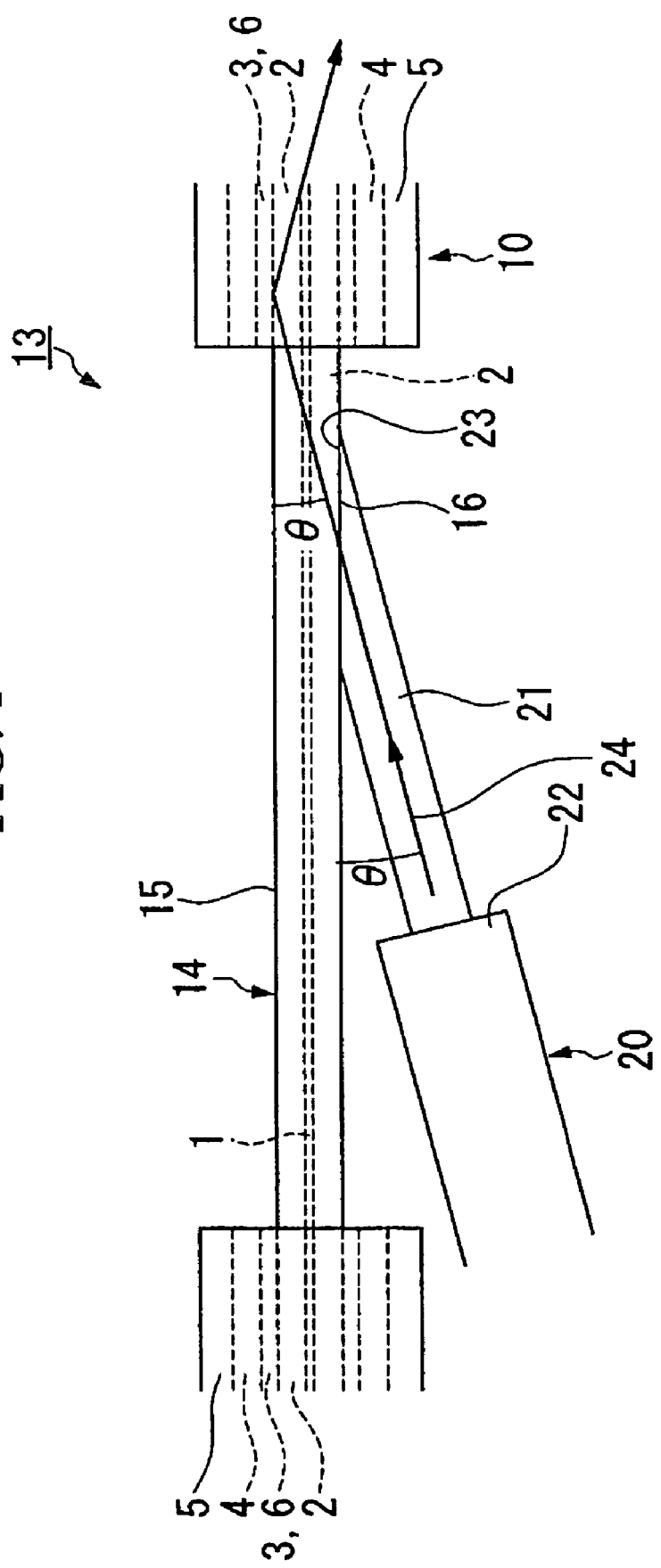
FIG. 1 is a general view for an embodiment for a structure for emitting an excited light into the optical amplification medium fiber according to the present invention.

FIG. 1 is a general view for an embodiment for a structure (hereinafter may be called a "structure for the excited light incidence") for emitting an excited light into the optical amplification medium fiber according to the present invention. Also, FIG. 2 is a cross section for an optical amplification medium fiber which is used for the structure for the incidence of the excited light shown in FIG. 1.

Figure 2:
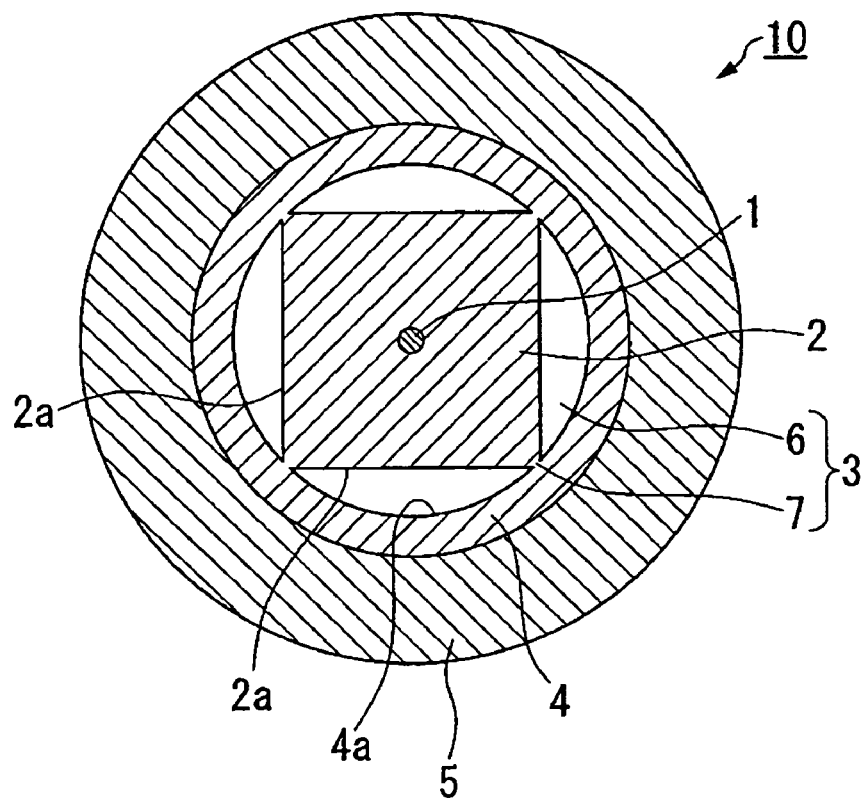
FIG. 2 is a cross section for an optical amplification medium fiber which is used for the structure for the incidence of the excited light shown in FIG. 1.

As shown in FIG. 2, an optical amplification medium fiber 10, which is used for a structure for the incidence of the excited light according to the present embodiment comprises a core 1 into which a rare-earth element is doped, an inner cladding 2 which is disposed on a periphery of the core 1, a porous layer 3 which is formed on an outer periphery of the inner cladding 2, an outer cladding 4 which is disposed on an outer periphery of the porous layer 3, and a coating 5 which is disposed on an outer periphery of the outer cladding 4. Four sets of holes 6 which have an arch cross section and a connecting sections 7 which connect an outer periphery of the inner cladding 2 and an inner periphery of the outer cladding 4 are formed alternately in a circular direction between the inner cladding 2 and the outer cladding so as to form a porous layer 3. The holes 6 are formed so as to extend in a longitudinal direction of the optical amplification medium fiber 10.

Here, the inner cladding 2 has an approximate rectangular cross section. The outer cladding 4 has a circular cross section. Additionally, an edge line of the outer periphery surface 2a in the inner cladding 2 is disposed so as to coincide with the inner periphery surface 4a of the outer cladding 4 in the connecting section 7.

Here, the shape of the cross section of the inner cladding 2 is not particularly limited to a rectangular shape. It is preferable that there should be a planar section in the outer periphery surface 2a which faces the holes 66 in the inner cladding 2 so as to be connected to the optical fiber 20 for excited light incidence. For example, it is possible to form the cross section of the inner cladding 2 to be a multilateral shape such as a triangular shape, a pentagonal shape, or a hexagonal shape. It is acceptable if the outer periphery surface 2a of the inner cladding 2 is a curved surface as long as the inner cladding 2 is cemented to the optical fiber 20 for excited light incidence reliably.

It is possible to form the core 1 by a rare-earth-element-doped glass member which is formed by doping a rear-earth element into a silica glass member. For such a rare-earth element, it is possible to use erbium (Er), thulium (Tm), yttrium (Y), ytterbium (Yb), holmium (Ho), samarium (Sm), praseodymium (Pr), and neodymium (Nd) as long as it is used for the optical amplification medium fiber conventionally.

It is possible to form the inner cladding 2 and the outer cladding 4 by a silica glass or a silica glass member which is formed by doping a commonly known dopant such as a germanium or a fluorine into the selica glass. It is possible to dope approximately 100 to 2000 ppm of mass ratio of rare-earth element into the selica glass. Also, it is possible to dope the rare-earth element not only into the core 1 but also into a section near the core 1 in the inner cladding 2. Additionally, it is possible to use a material member which is used for a commonly known silica glass member fiber or a fluorine optical fiber for the material member for the optical amplification medium fiber 10.

Figure 3:
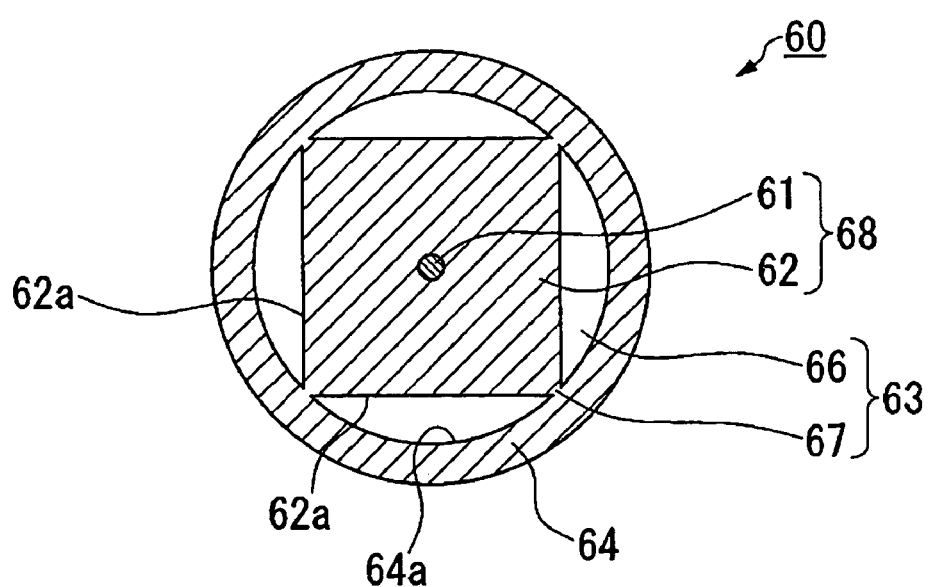
FIG. 3 is a cross section for an example of a material member which is used for manufacturing the optical amplification medium fiber shown in FIG. 2.
Figure 4:
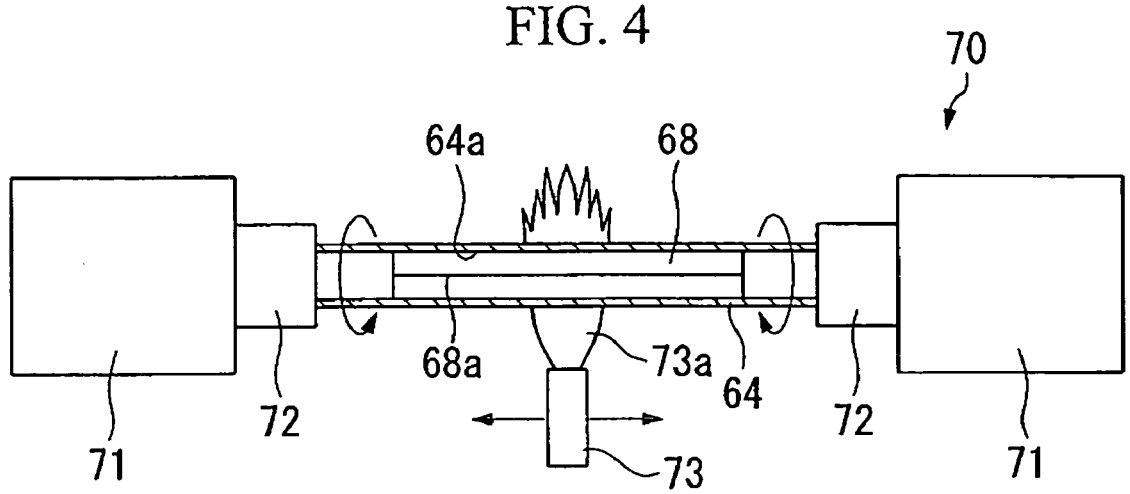
FIG. 4 is a general view for explaining an example for a manufacturing device for manufacturing a material member shown in FIG. 3.

FIG. 3 is a cross section for an example of a material member which is used for manufacturing the optical amplification medium fiber. FIG. 4 is a general view for explaining manufacturing steps for manufacturing a material member shown in FIG. 3.

The material member 60 shown in FIG. 3 is provided with a core section 61, an inner cladding 62, a porous layer 63 and an outer cladding 64 each of which correspond to the core 1 the inner cladding 2, the porous layer 3, and the outer cladding 4 in the optical amplification medium fiber 10. Also, a material member manufacturing device 70 shown in FIG. 4 is provided with at least a pair of a glass lathes 71, which are provided with a chuck 72 for grasping a glass tube 64 and a burner 73 for heating the glass tube 64.

It is possible to manufacture the material member 60 by a method which is shown in FIG. 4 for example.

First, a square pillar glass bar 68 which forms a core section 61 and the inner cladding 62 is inserted in the glass tube 64 which forms the outer cladding of the material member 60. For such a glass bar 68, it is possible to use a member which is formed by cutting and grinding a cylindrical silica glass bar, into which germanium is doped for enhancing a refractive index and a rare-earth element is doped for amplifying the light, so as to be a prismatic bar in a central section such as a core section 61.

Consequently, the both ends of the glass tube 64 in which the glass bar 68 is inserted is grasped by a chuck 72 of the glass lathe 71. Furthermore, the glass tube 64 is heated by a flare 73a by the burner 73 which is disposed outside of the glass tube 64 while rotating the glass tube 64 around the center of the glass tube 64 by the glass lathe 71. The burner 73 is traversed in a longitudinal direction of the glass tube 64 while being heated. The inner diameter and the outer diameter of the glass tube 64 shrink in accordance with the heating operation for the outer glass tube 64 by an acid hydrogen flare 73a so as to soften the glass tube 64. Thus, the inner surface 64a of the glass tube 64 (outer cladding) sticks to an edge line 68a of a side (outer periphery surface of the inner cladding) of the glass bar 68 so as to be unified.

By doing this, the section in which the glass tube 64 and the glass bar 68 stick forms a connecting section 67. Also, the space between the inner periphery surface 64a of the glass tube 64 and the outer periphery surface 62a of the glass bar 68 which does not stick to the inner surface of the glass tube 64 forms holes 66; thus, it is possible to obtain a material member 60 which has the porous layer 63.

The material member 60 which has the porous layer 63 is drawn by using a drawing device which is used for drawing an optical fiber until the diameter of the material member 60 coincides with the diameter of the optical fiber 10. A resin coating 5 is formed by coating the drawn optical fiber by a resin when the optical fiber is drawn. By doing the above operations, it is possible to obtain the optical amplification medium fiber 10 which is shown in FIG. 2.

In a structure 13 for emitting an excited light so as to incident according to the present embodiment as shown in FIG. 1, the coating 5 and the outer cladding 4 of the optical amplification medium fiber 10 are removed in a part of the longitudinal direction. Here, the inner cladding 2 is exposed in the inner cladding exposure section 14. The porous layer 3 and the outer cladding 4 remain on the both ends of the inner cladding exposure section 14. An end surface 23 of the optical fiber 20 for excited light incidence is cemented to a cementing section 16 which forms a part of an outer periphery 15 of the exposed inner cladding 2.

It is acceptable if the connecting section 7 and a section which is near the outer cladding 4 may remain in the inner cladding exposure section partly as long as these sections do not disturb the connection for the optical fiber 20 for excited light incidence and the incidence of the excited light 24. Also, it is acceptable if the connecting section 7 and a section which is near the outer cladding 4 may be removed from the optical fiber 20 for excited light incidence completely.

Although it is not shown in the drawings specifically, it is possible to attach a soft protecting member which is formed by a sponge member or a rubber member to the structure 13 for the incidence of excited light so as to protect the inner cladding exposure section 14 and the cementing section 16. Also, it is possible to dispose a cover such as a housing or a casing which are formed by a plastic member or a metal member. In such a case, it is possible to enhance a mechanical stability and durability for the structure 13 for the incidence of the excited light.

Here, the optical fiber 20 for excited light incidence serves for emitting the excited light which is output from the excited light source (such as a laser diode) and transmitting the excited light so as to be incident into the optical amplification medium fiber 10. For such an optical fiber 20 for excited light incidence, it is possible to use a normal silica glass member single mode optical fiber wire in which a resin coating 22 is disposed on an outer periphery of a naked optical fiber 21. It is possible to name an ultra-violet-ray-curable resin such as an acrylic resin for a resin which is used for the resin coating 22.

The end surface 23 of the optical fiber 20 for excited light incidence is formed so as to be disposed diagonal to an optical axis of the optical fiber 20 such that the excited light can be emitted so as to be incident into the optical amplification medium fiber 10 diagonally by an incident angle θ.

Next, an example for a method for manufacturing a structure for the incidence of the excited light is explained.

Figure 5:
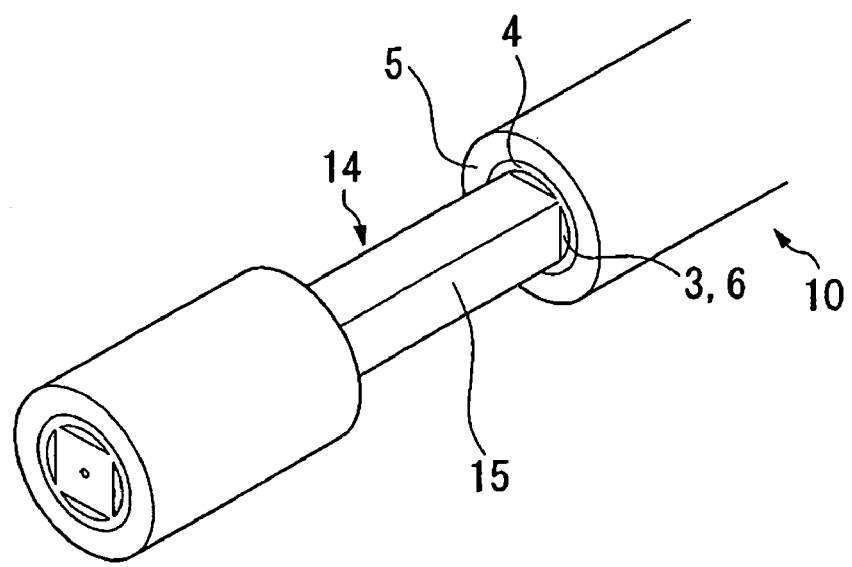
FIG. 5 is an isometric view for an example in which an inner cladding exposure section is formed in the optical amplification medium fiber shown in FIG. 2.
Figure 6:
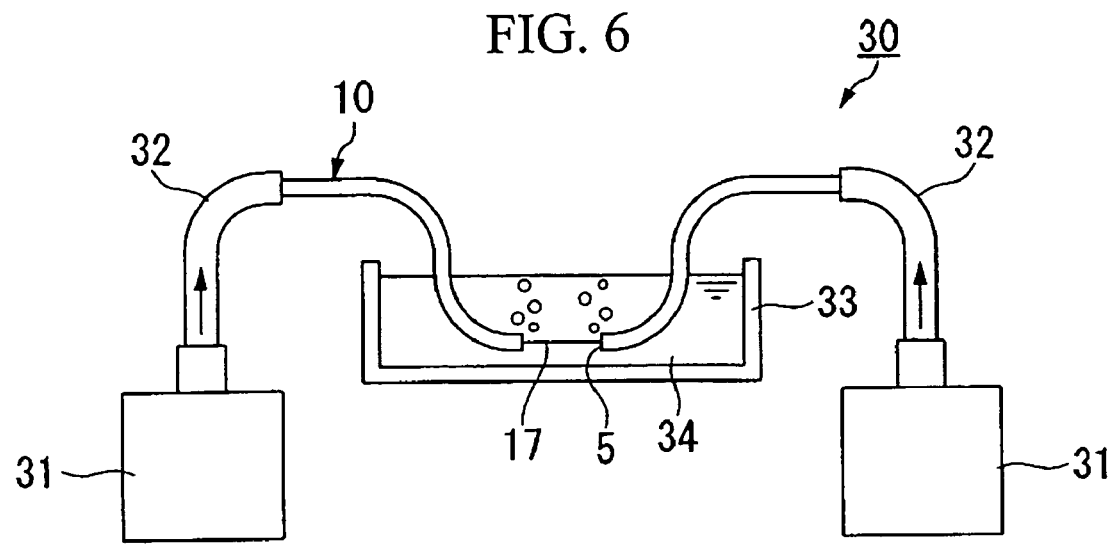
FIG. 6 is an isometric view for an example for a device for forming the inner cladding exposure section in the optical amplification medium fiber shown in FIG. 2.

FIG. 5 is an isometric view for an example in which an inner cladding exposure section 14 is formed in the optical amplification medium fiber 10. FIG. 6 is a general view for an example for an etching device for forming the inner cladding exposure section 14 in the optical amplification medium fiber 10.

The etching device 30 shown in FIG. 6 is provided with a tank 33 in which an etching liquid member 34 such as a hydrogen fluoride and two air pumps 31, 31.

A member which is not eroded by the etching liquid member 34 is used for the tank 33. If the etching liquid member 34 is a water solution for the hydrogen fluoride, it is possible to use a polytetrafluoroetylene (PTFE) etc.

Although it is not shown in the drawing specifically, it is possible to dispose a temperature controller for maintaining the temperature of the etching liquid member 34 in the tank 33.

In order to form the inner cladding exposure section 14 in the optical amplification medium fiber 10 by using the etching device 30, first, a coating removed section 17 is formed by removing a coating 5 in a section which forms the inner cladding exposure section 14. After that, the air pumps 31, 31 are connected to the both ends of the optical amplification medium fiber 10 via a connecting tube 32 respectively. After that, an air is compressed so as to be sent to the holes 6 in the optical amplification medium fiber 10 so as to apply a compression thereinside. The coating removed section 17 is dipped in the etching liquid member 34 under the above condition. By doing this, the outer cladding 4 of the optical amplification medium fiber 10 is etched so as to be removed; thus, the inner cladding exposure section 14 is formed. In such a case, a compression is applied in the holes 6; therefore, it is avoided that the etching liquid member 34 may enter in the holes 6 by a capillary phenomenon when the outer cladding is removed and the aperture of the holes 6 are exposed to the etching liquid member 34.

In order to cement the end surface 23 of the optical fiber 20 for excited light incidence to the inner cladding exposure section 14, for example, there is a method in which the coating 5 on the end surface 23 of the optical fiber 20 for excited light incidence is removed so as to expose the naked optical fiber 21 and the end surface 23 is cut diagonally so as to be bonded to the inner cladding exposure section 14 in a melt bonding operation. Also, it is acceptable if a bonding agent is used for the a melt bonding method. The optical fiber 20 for excited light incidence is cemented such that the excited light (see FIG. 1) is emitted so as to be incident into the inner cladding 2 of the optical amplification medium fiber 10 so as to be guided by the porous layer 3. Here, if the inner cladding 2 is prismatic, a cementing section 16 at which the inner cladding 2 is cemented with the end surface 23 of the optical fiber 20 for excited light incidence is planar. Therefore, it is possible to cement the inner cladding exposure section 14 to the optical fiber 20 for excited light incidence easily. Also, it is possible to easily increase rigidity in the cemented section.

Next, a method is explained in which a light is excited in the optical amplification medium fiber 10 by using a structure 13 for the incidence for the excited light according to the present embodiment.

As shown in FIG. 1, an excited light source such as a laser diode is connected to an end surface (not shown in the drawing) which is opposite to the end surface 23 of the optical fiber 20 for excited light incidence which is cemented to the optical amplification medium fiber 10. The excited light 24 which is output from the excited light source is transmitted in the optical fiber 20 for excited light incidence so as to be emitted from the end surface 23 of the optical fiber 20 for excited light incidence. By doing this, the excited light 24 is emitted so as to be incident into the inner cladding 2 of the optical amplification medium fiber 10.

Figure 17:
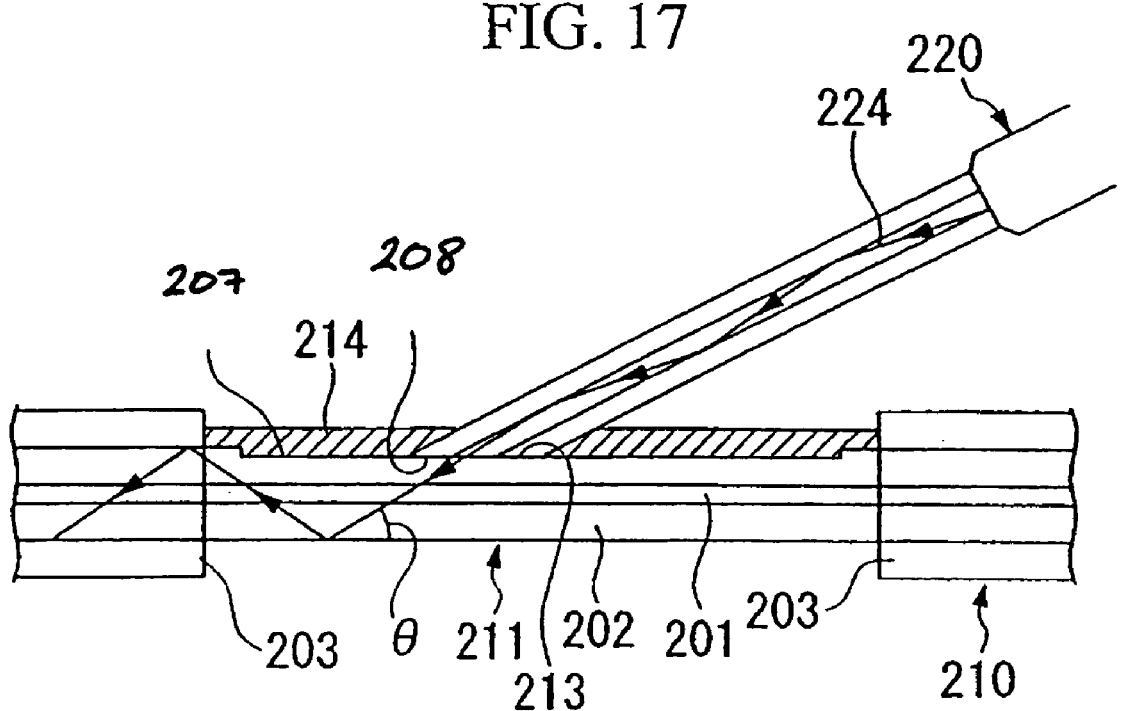
FIG. 17 is a general view for another example for a conventional method for exciting a optical amplification medium fiber optically.

The porous layer 3 exists on an outer periphery of the inner cladding 2; therefore, the refractive index difference between the inner cladding 2 and the porous layer 3 is sufficiently large as compared to a conventional case shown in FIG. 17. Therefore, the upper limit for the angle for the incidence of the excited light 24 which can be transmitted in the inner cladding 2 is greater than that in the conventional case. Therefore, it is possible to transmit a greater quantity of components in the inner cladding 2. Therefore, it is possible to emit the excited light so as to be incident from the optical fiber 20 for excited light incidence into the optical amplification medium fiber 10 more efficiently.

Figure 13:
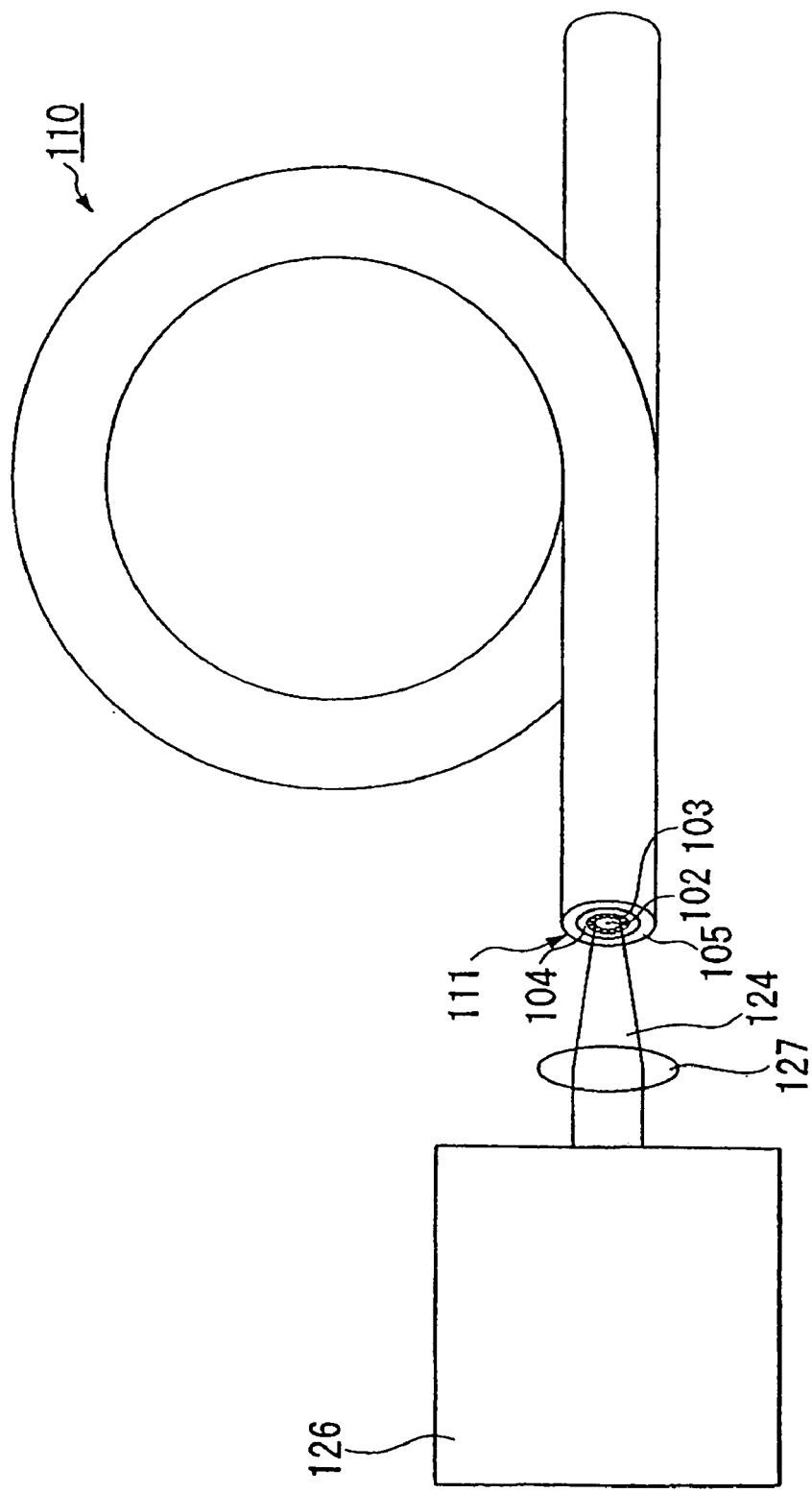
FIG. 13 is a general view for an example for a conventional method for exciting a optical amplification medium fiber optically.
Figure 14:
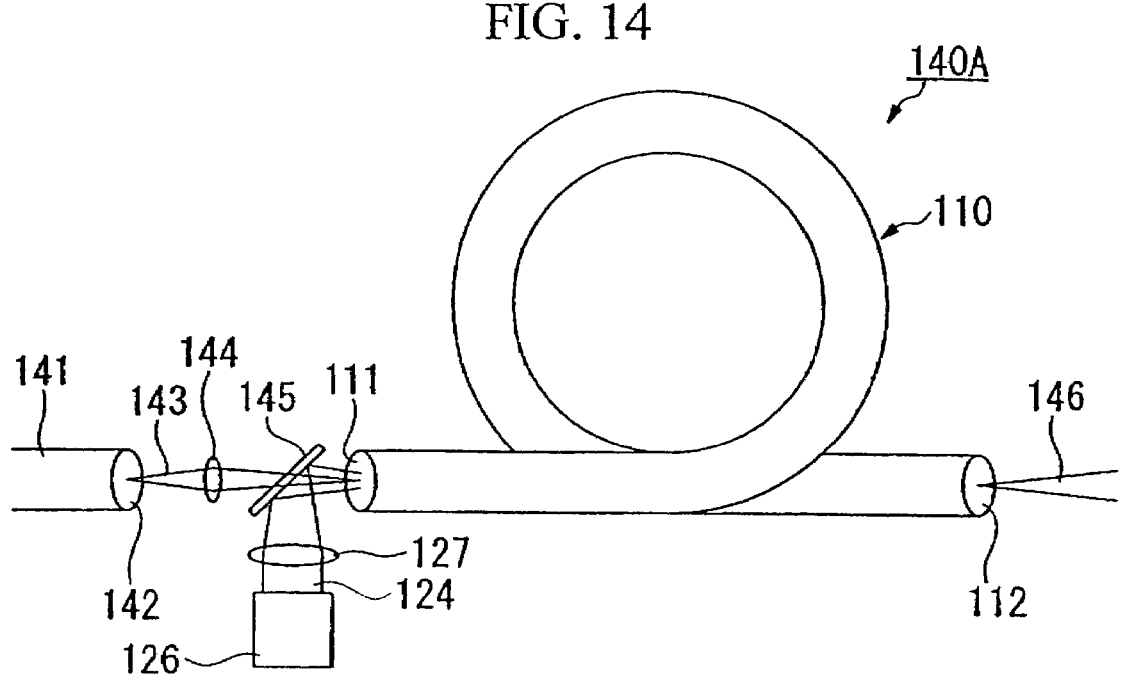
FIG. 14 is a general view for a first example for a conventional optical fiber amplifier.

Also, as compared with a method for exciting a light shown in FIG. 13, the optical fiber 20 for excited light incidence and the optical amplification medium fiber 10 are cemented directly according to the method for exciting the light according to the present embodiment; therefore, there is a fewer optical loss. The light condensing lens is not necessary; therefore, it is possible to reduce a manufacturing cost by reducing the number of the parts. Also, the optical axis is hardly misaligned due to other external factors such as mechanical factors such as vibration and collision or temperature conditions; therefore, it is possible to maintain desirable optical characteristics.

Figure 7:
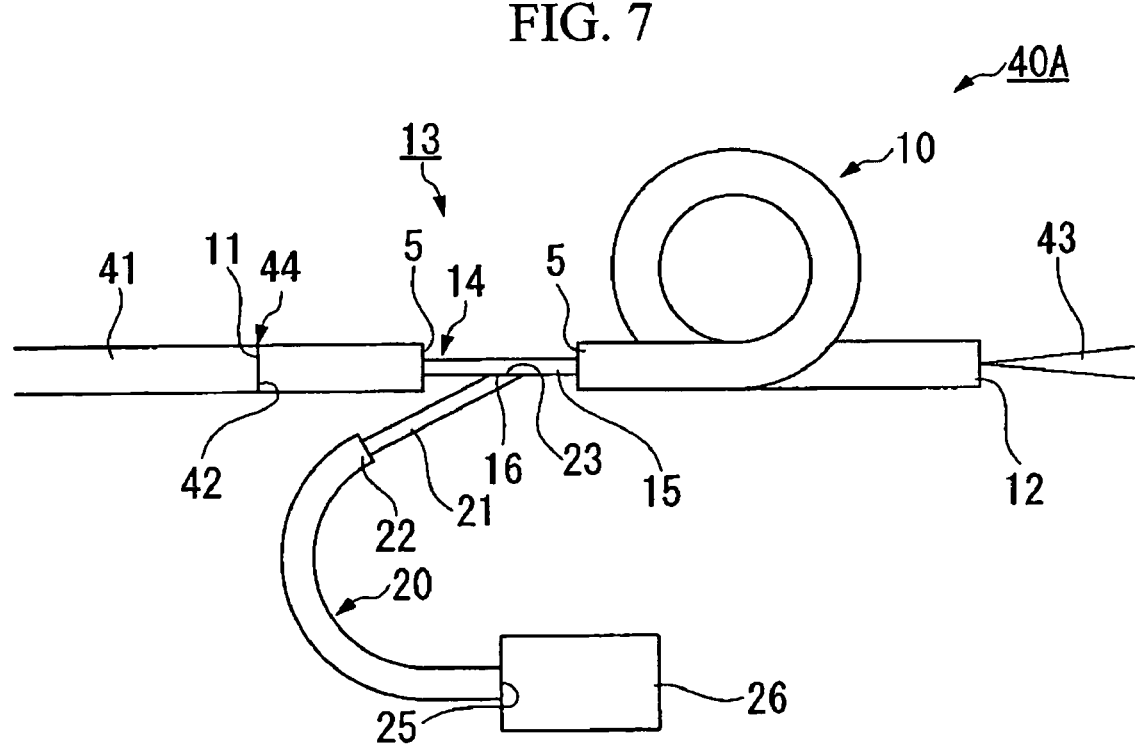
FIG. 7 is a general view for a first example for an optical fiber amplifier according to a first embodiment.

FIG. 7 is a general view for a first embodiment of an optical fiber amplifier (hereinafter it is simply called as an "optical fiber amplifier") according to the present invention.

An optical fiber amplifier 40A has a structure 13 for the incidence of the excited light in which an outer periphery 15 of the inner cladding exposure section 14 which is formed in a part of the optical amplification medium fiber 10 in a longitudinal direction and an end surface 23 of the naked optical fiber 21 in the optical fiber 20 for the excited light incidence are cemented.

An excited light source 26 is connected to an end surface 25 which is disposed opposite to the end surface 23 of the optical fiber 20 for excited light incidence.

Furthermore, an end surface 42 of an optical fiber 41 for signal light incidence is melt-bonded to an inputting end 11 of the optical amplification medium fiber 10 so as to form a melt-bonding connecting section 44.

It is possible to connect the optical amplification medium fiber 10 and the optical fiber 41 for signal light incidence by aligning optical fibers 10, 41 such that a signal light is launched into a core 1 in the optical amplification medium fiber 10 under condition that the signal light is transmitted in the optical fiber 41 for signal light incidence and heating the end surface 11, 42 of the optical fibers 10, 41 while maintaining the aligned condition so as to perform the melt-bonding operation.

In such an optical fiber amplifier 40A, it is possible to excite a rare-earth element which is doped into a core 1 in the optical amplification medium fiber 10 by the excited light which is emitted so as to be incident into the optical amplification medium fiber 10 via a structure 13 for the excited light incidence. Also, it is possible to amplify the signal light which is launched into the optical amplification medium fiber 10 from the optical fiber 41 for signal light incidence so as to obtain an amplified output signal light 43 from the other end of the optical amplification medium fiber 10.

That is, an alignment for the optical fibers should be performed only for the optical fiber 41 for the signal light incidence so as to manufacture the optical fiber amplifier 40A; thus, it is possible to save a labor in a manufacturing process. Also, once the optical fibers are connected, it is possible to maintain the connection for the optical fiber 41 for the signal light incidence and the optical fiber 20 for excited light incidence with the optical amplification medium fiber 10 reliably. Therefore, a misalignment of the optical axes does not occur due to other external factors such as mechanical factors or temperature conditions. In addition, there exists a porous layer 3 as explained above. Therefore, it is possible to emit the excited light so as to be incident into the optical amplification medium fiber 10 from the optical fiber 20 for excited light incidence more efficiently. Therefore, it is possible to realize an optical fiber amplifier which has a reliable amplitude and reliability. Therefore, it is possible to emit the excited light so as to be incident into the optical amplification medium fiber 10 from the optical fiber 20 for excited light incidence more efficiently. Therefore, it is possible to realize an optical fiber amplifier which has a reliable amplitude and reliability.

Figure 8:
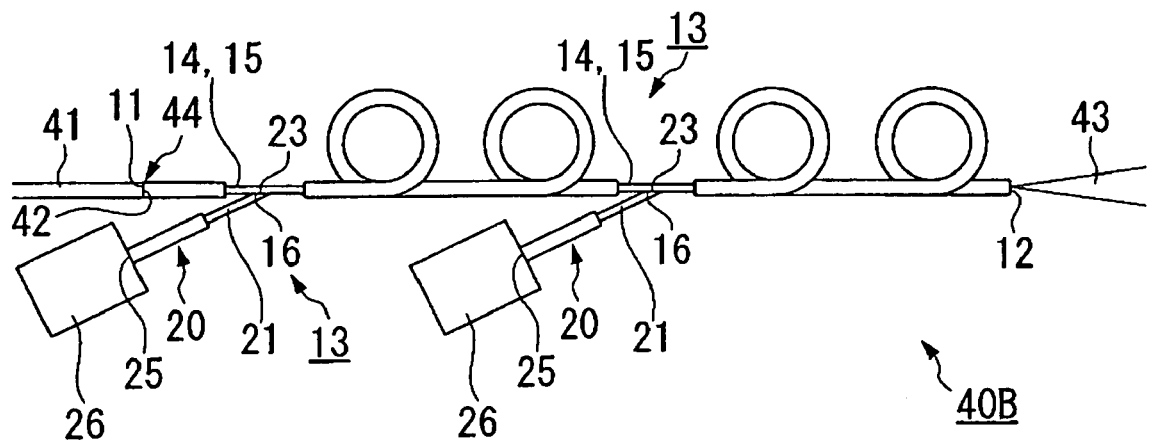
FIG. 8 is a general view for a second example for an optical fiber amplifier according to a first embodiment.

FIG. 8 is a general view for an optical fiber amplifier according to a second embodiment of the present invention. An optical amplification medium fiber is formed so as to be longer so as to increase the amplitude in such an optical fiber amplifier 40B. The excited light which is emitted so as to be incident into the optical fiber 20 for the excited light incidence diminishes while being transmitted in the optical amplification medium fiber 10. Therefore, a plurality of structures 13, (here, two structures) for the excited light incidence are disposed so as to have intervals such that the excited light is not diminished so greatly. The structure 13 for the excited light incidence has the same structure as that in the optical fiber amplifier according to the above explained first embodiment. Here, the excited light source 26 is disposed for each structure 13 for the excited light incidence.

In the optical fiber amplifier 40B according to the present embodiment, it is possible to supply the excited light over an entire length of the optical amplification medium fiber 10 even if the optical amplification medium fiber 10 is longer than the length of the diminished excited light. Therefore, it is possible to supply the excited light which is emitted from a plurality of the excited light sources 26 so as to be incident into the optical amplification medium fiber 10; thus, it is possible to form the optical fiber amplifier which has a great amplitude.

Also, the excited light is input in a dispersed manner from a plurality of sections; therefore, a heat which is caused by absorbing the excited light is dispersed. Thus, it is possible to avoid an overheat in an optical amplification medium fiber 10 partially.

Figure 15:
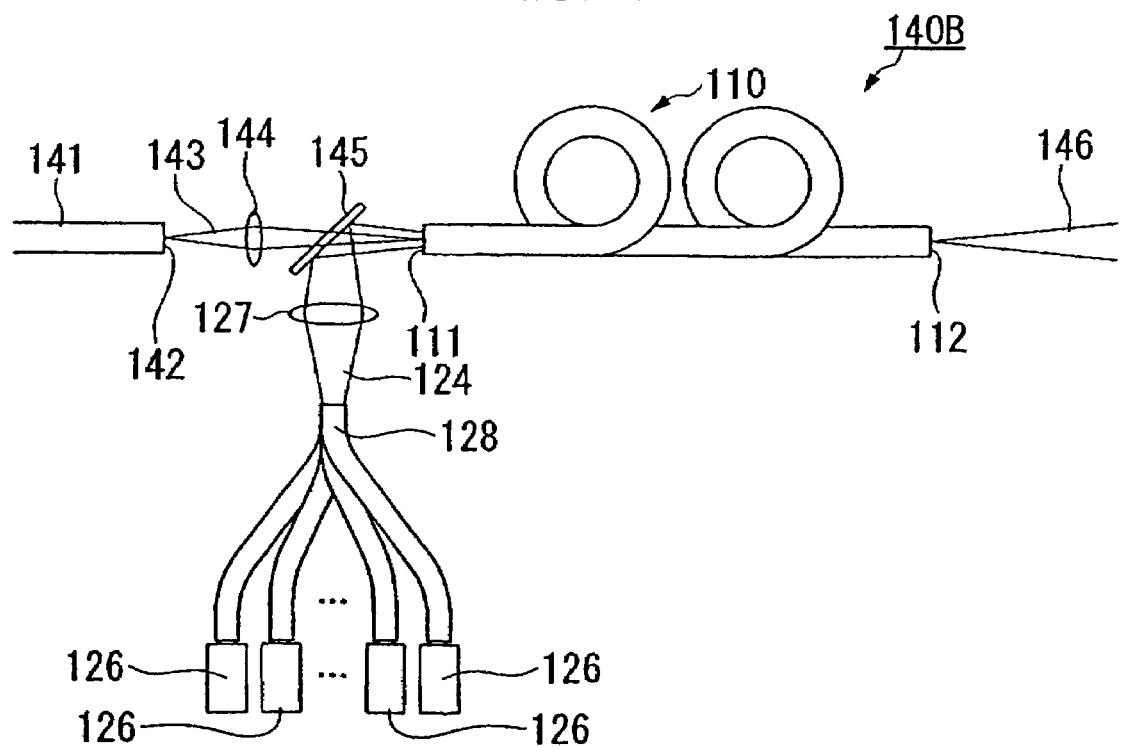
FIG. 15 is a general view for a second example for a conventional optical fiber amplifier.
Figure 16:
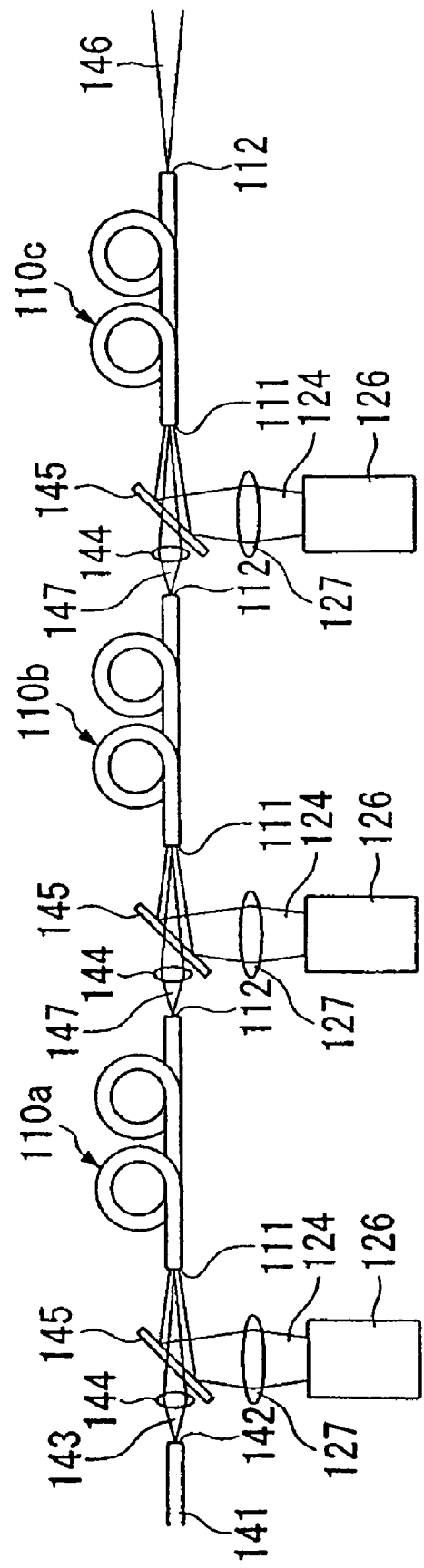
FIG. 16 is a general view for a third example for a conventional optical fiber amplifier.

In a comparison between the optical fiber amplifier 40B according to the present embodiment and the conventional optical fiber amplifier 140B, 140C shown in FIGS. 15 and 16, it is not necessary to extract the signal light in a space beam condition in the optical fiber amplifier 40B; thus, it is possible to reduce the loss for the signal light. Also, it is not necessary to dispose an optical mixing element for mixing the excited light; therefore, it is possible to reduce the number of the parts. In addition, there is an advantage in that it is possible to emit the excited light from the excited light source 26 so as to be incident into the optical amplification medium fiber 10 at a low loss.

Next, an optical fiber laser according to the present invention is explained.

Figure 9:
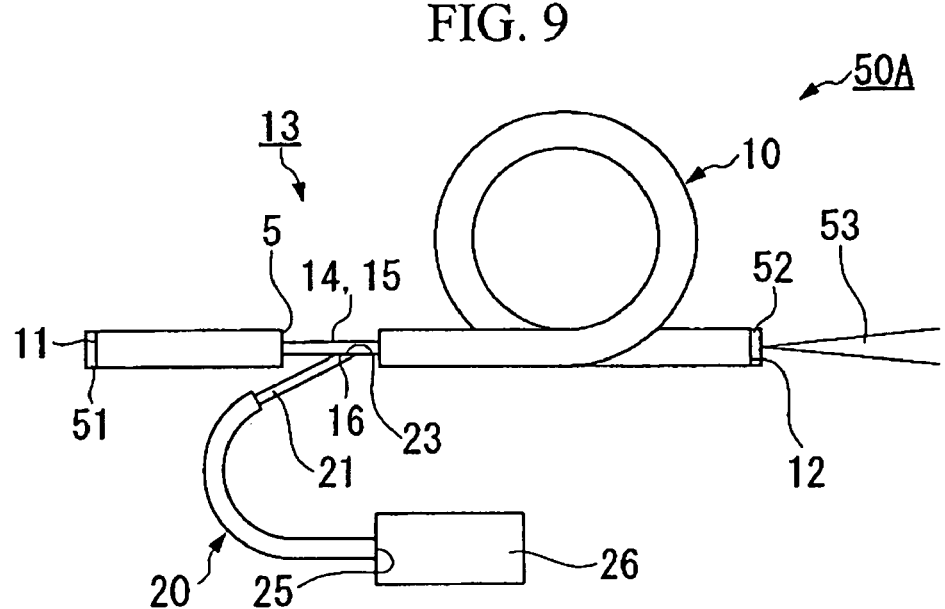
FIG. 9 is a general view for an optical fiber laser according to a first embodiment.

FIG. 9 is a general view for an optical fiber laser according to a first embodiment of the present invention.

Such an optical fiber laser 50A is provided with an inner cladding 14 which is formed on the optical amplification medium fiber 10, and a structure 13 for the above explained excited light incidence to which an end surface 23 of a naked fiber 21 of the optical fiber 20 for the excited light incidence is cemented.

The excited light source 26 is connected to the other end surface 25 which is disposed opposite to the end surface 23 of the optical fiber 20 for the excited light incidence.

Furthermore, a complete reflection mirror 51 is disposed on an end surface 11 of the optical amplification medium fiber 10. Also, an outputting mirror 52 through which a part of the light transmits is disposed on the other end surface 12 which is disposed opposite to the end surface 11. The complete reflection mirror 51 and the outputting mirror 52 are fixed on the end surfaces 11, 12 of the optical amplification medium fiber 10 by, for example, a bonding agent. For such mirrors 51, 52, it is possible to use an appropriate member which is suitable for the excited light and a wavelength of the light which is emitted from the optical amplification medium fiber 10 among mirrors which are used for a commonly known laser oscillator.

In FIG. 9, the structure 13 for the excited light incidence is formed near the end surface 11 near the complete reflection mirror 51. The optical fiber 20 for the excited light incidence is cemented in a direction toward a right-hand side on FIG. 9 which is directed to the outputting mirror 52. However, the optical fiber laser according to the present invention is not limited to such a structure. It is acceptable if the structure 13 for the excited light incidence may be formed near the end surface 12 near the outputting mirror 52 and the optical fiber 20 for the excited light incidence may be connected in a direction toward a right-hand side on FIG. 9 which is directed to the complete reflection mirror 51 are a reverse structure.

According to such an optical fiber laser 50A, the excited light which is emitted from the optical fiber 20 for the excited light incidence so as to be incident into the optical amplification medium fiber 10 excites the rare-earth element in the core 1 in the optical amplification medium fiber 10. The excited rare-earth element emits a light which has a predetermined wavelength according to an energy level naturally. Such a naturally emitted light is amplified while being reflected between the complete reflection mirror 51 and the outputting mirror 52 repeatedly so as to be transmitted in the optical amplification medium fiber 10; thus, there occurs a laser oscillation. It is possible to obtain an output of the laser light 53 by outputting a part of the oscillated laser light from the outputting mirror 52.

It is possible to form a highly efficient optical fiber laser which has a simple structure by using a structure 13 for the excited light incidence in which it is possible to emit the excited light so as to be incident into the optical amplification medium fiber 10 with a high connection efficiency in this way.

Figure 10:
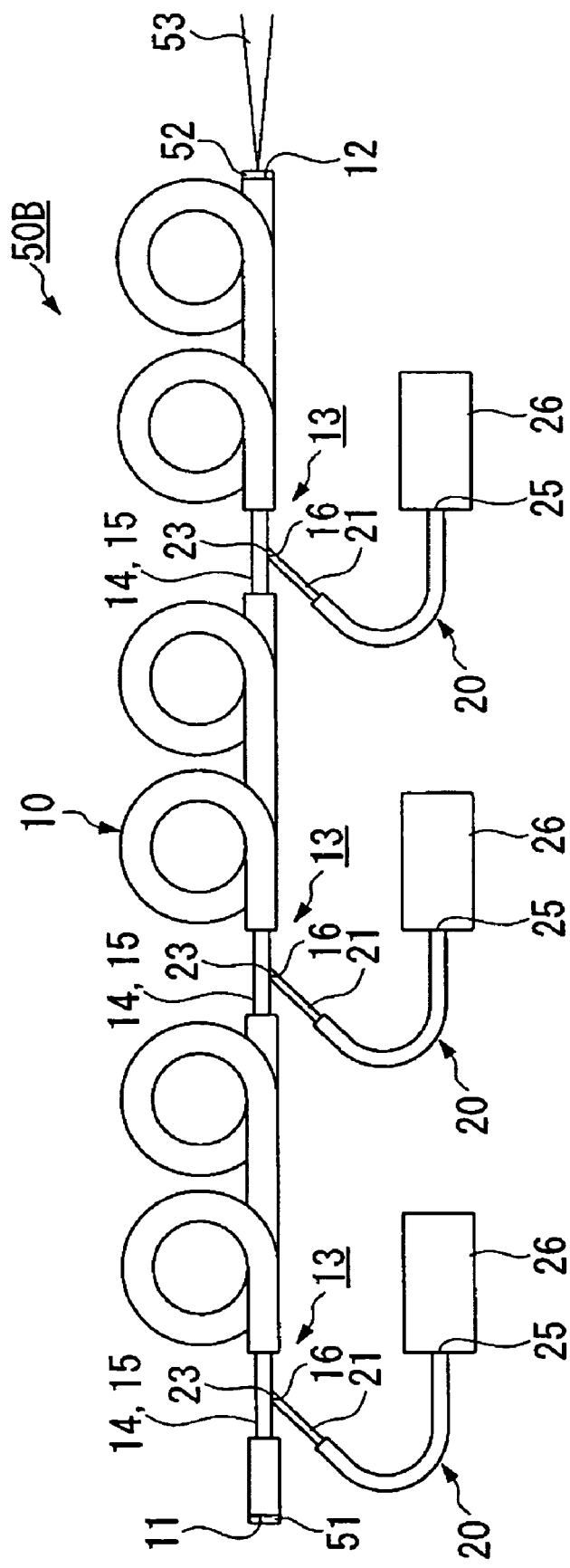
FIG. 10 is a general view for an optical fiber laser according to a second embodiment.

FIG. 10 is a general view for an optical fiber laser according to a second embodiment of the present invention. As similar to the above explained optical fiber laser 50A according to the first embodiment, the optical fiber laser 50B is provided with an optical amplification medium fiber 10 which has a complete reflection mirror 51 on its end surface 11 and an outputting mirror 52 on its another end surface 12.

The optical amplification medium fiber 10 is formed so as to have relatively a long length so as to obtain a laser light which has a high intensity. The excited light which is emitted so as to be incident into the optical fiber 20 for the excited light incidence diminishes while being transmitted in the optical amplification medium fiber 10 because the excited light is absorbed by the rare-earth element. Therefore, a plurality of structures 13, 13 for the excited light incidence are disposed so as to have intervals such that the excited light is not diminished so greatly.

Each structure 13 for the excited light incidence has the same structure in the above structure for the excited light incidence such that the excited light source 26 is disposed for each structure 13 for the excited light incidence.

In the optical fiber amplifier 40B according to the present embodiment, it is possible to supply the excited light over an entire length of the optical amplification medium fiber 10 even if the optical amplification medium fiber 10 is longer than the length of the diminished excited light in the optical amplification medium fiber 10. Therefore, it is possible to obtain a laser light 53 which has a high intensity.

Figure 11:
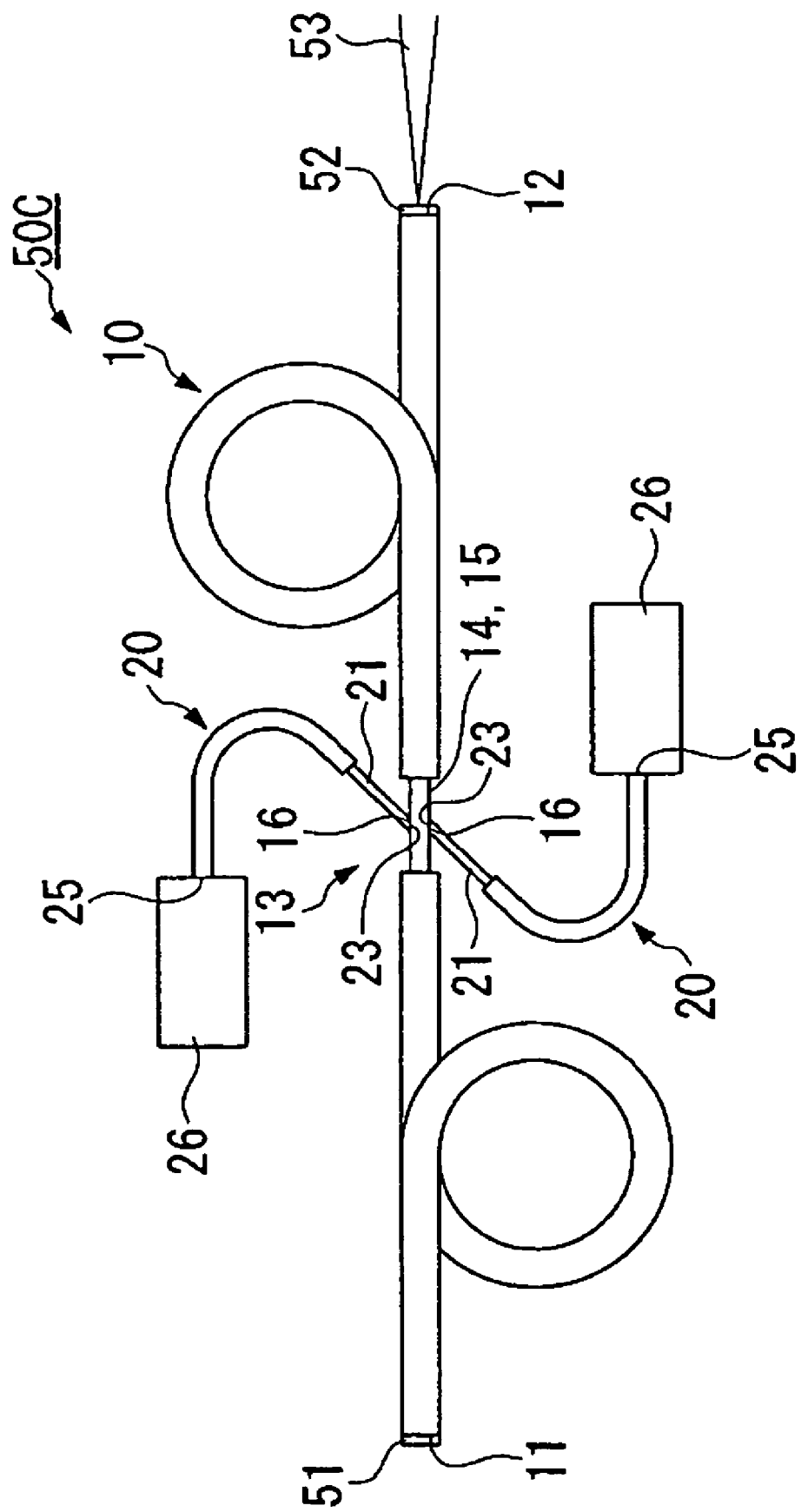
FIG. 11 is a general view for an example for an optical fiber laser according to a third embodiment.

FIG. 11 is a general view for an optical fiber laser according to a third embodiment of the present invention. As similar to the above explained optical fiber laser 50A according to the first embodiment, the optical fiber laser 50C is provided with an optical amplification medium fiber 10 which has a complete reflection mirror 51 on its end surface 11 and an outputting mirror 52 on its another end surface 12.

An inner cladding exposure section 14 is formed in a middle section in the longitudinal direction of the optical amplification medium fiber 10. The optical amplification medium fiber 10 has a sufficient length for exciting the light on both ends of the inner cladding exposure section 14.

Two optical fibers 20, for the excited light incidence are cemented to the inner cladding exposure section 14 such that each optical fiber 20 for the excited light incidence are cemented toward in directions for the outputting mirror 52 and the complete reflection mirror 51 respectively. The excited light source is connected to the end surface 25 which is cemented to the optical amplification medium fiber 10 in the optical fiber 20 for the excited light incidence and the end surface 25 which is disposed opposite to the end surface 23.

It is possible to cement two optical fibers 20, for the excited light incidence with an inner cladding exposure section 14 in the optical fiber laser 50C according to the present embodiment. Therefore, it is possible to excite a section in the optical amplification medium fiber 10 which is disposed nearer the outputting mirror 52 than the inner cladding exposure section 14 and a section in the optical amplification medium fiber 10 which is disposed nearer to the complete reflection mirror 51 than the inner cladding exposure section; thus, it is possible to obtain a laser light 53 which has a high intensity.

Preferable embodiments for the present invention are explained above. The present invention is not limited to such embodiments. That is, various modifications are available without departing from the spirit and scope of the invention as defined in the appended claims.

There is not a specific limit for a quantity of the structure for the excited light incidence in a piece of the optical amplification medium fiber and the quantity for the optical fiber for the excited light incidence in a structure for the excited light incidence as long as it is greater than 1. That is, such a quantity may be plural such as two.

Figure 12:
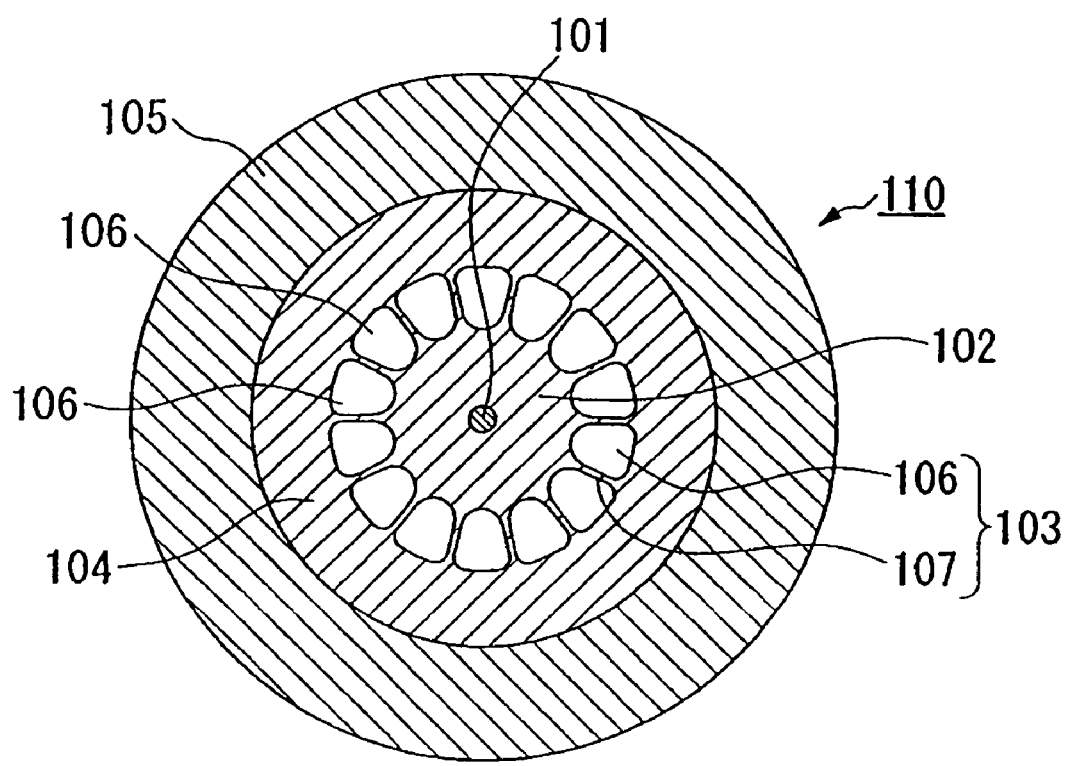
FIG. 12 is a cross section for an example for the optical amplification medium fiber.

Also, in the present invention, the optical amplification medium fiber which has a porous layer in the cladding is not limited to the structure shown in FIG. 2. That is, it is acceptable for using the optical amplification medium fiber shown in FIG. 12. The cross section of the hole and the quantity of the hole are not limited specifically. It is preferable that the width of the connecting section for connecting the inner cladding and the outer cladding should be as small as possible such that the outer periphery may be exposed easily when the outer cladding is removed by an etching operation etc.

Also, it is acceptable if the optical amplification medium fiber has at least two porous layers (for example, an inner porous layer and an outer porous layer) in a radial direction of the cladding. In such a case, a certain extent of the porous layer in the cladding is removed in the inner cladding exposure section. In addition, the outer cladding which is disposed in an outer periphery of the porous layer is a cladding in a section which is removed in the inner cladding exposure section. Also, the inner cladding which is disposed inside of the porous layer is a cladding in a section of which outer periphery is exposed in the inner cladding exposure section. That is, it is acceptable if other porous layer may be disposed at least in the inner cladding and the outer cladding in addition to the porous layer which serves as a border for removing the cladding in the inner cladding exposure section.

Also, it is preferable that the optical amplification medium fiber has a resin coating because it is possible to protect the optical fiber from the external force and a collision so as to damage thereon. However, it is not necessary to dispose a coating if the optical fiber is used in a condition under which the optical fiber can be prevented from such external force. In a case in which the outer cladding is exposed without such a coating, there is an advantage in that it is possible to omit a manufacturing step for removing the coating in a manufacturing step for forming the inner cladding exposure section.

The present invention is further explained with reference to embodiments below.

Manufacturing Optical Amplification Medium Fiber

A cylindrical bar which is made of a silica glass member is prepared which has 2 mm of core diameter and 40 mm of outer diameter for a cladding. The core section of the cylindrical glass bar is formed by a silica glass member into which 1500 ppm (mass ratio) of erbium and approximately 10 MOL % of germanium are doped. The cladding is formed by a silica glass member.

Such a cylindrical bar is cut and ground so as to form a glass bar which has a square cross section such that a member of the square cross section is approximately 25 mm.

The obtained prismatic glass bar is inserted in a silica glass tube which has 44 mm of outer diameter and 4 mm thickness. A material member 60 which has a cross section shown in FIG. 3 is formed by forming the glass bar and the silica glass tube unitarily by using a material member manufacturing device 70 shown in FIG. 4.

The obtained material member 60 is drawn by a drawing device which is used for drawing an ordinary optical fiber so as to have a cladding diameter 300 μm. In addition, a coating of an ultra-violet-ray-curable resin is disposed thereon. Furthermore, it is possible to manufacture an optical amplification medium fiber by forming a resin coating by emitting an ultra-violet ray on the coated ultra-violet-ray-curable resin.

The obtained optical amplification medium fiber has a cross section shown in FIG. 2. It is observed that the porous layer is formed desirably.

Furthermore, the present invention is explained in detail.

Figure 18:
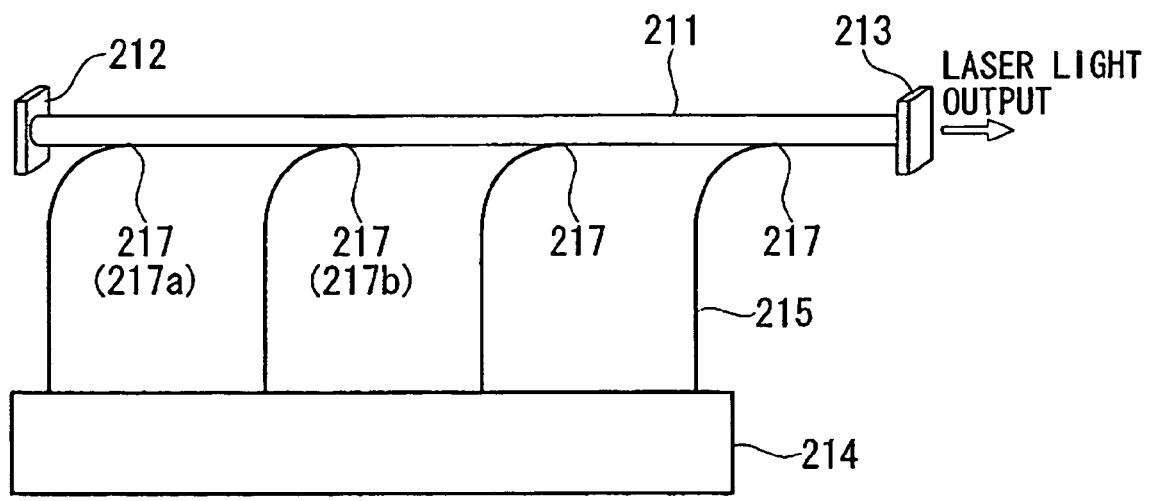
FIG. 18 is a general view for an optical fiber laser according to a second embodiment of the present invention.

FIG. 18 is a general view for showing a second embodiment of the optical fiber laser of the present invention.

In FIG. 18, reference numeral 211 indicates a rare-earth ion-doped fiber. Reference numeral 212, 213 indicate resonating mirrors. Reference numeral 214 indicates an excited LD module. Reference numeral 215 indicates a guide fiber.

Resonating mirrors 12, 13 are disposed on both end surfaces of the rare-earth-ion-doped fiber 211 in the optical fiber laser according to the present embodiment. Also, four guide fibers 215 extend from the excited LD module 214 such that these guide fibers 215 are connected to different sections on a side of the rare-earth-ion-doped fiber respectively with predetermined intervals. Hereinafter, a connecting section for the rare-earth-ion-doped fiber 211 and the guide fibers 215 is called as an excited light introducing section 217. The excited light is introduced from the guide fiber 215 to the rare-earth-ion-doped fiber 211 in the excited light introducing section 217.

Figure 19:
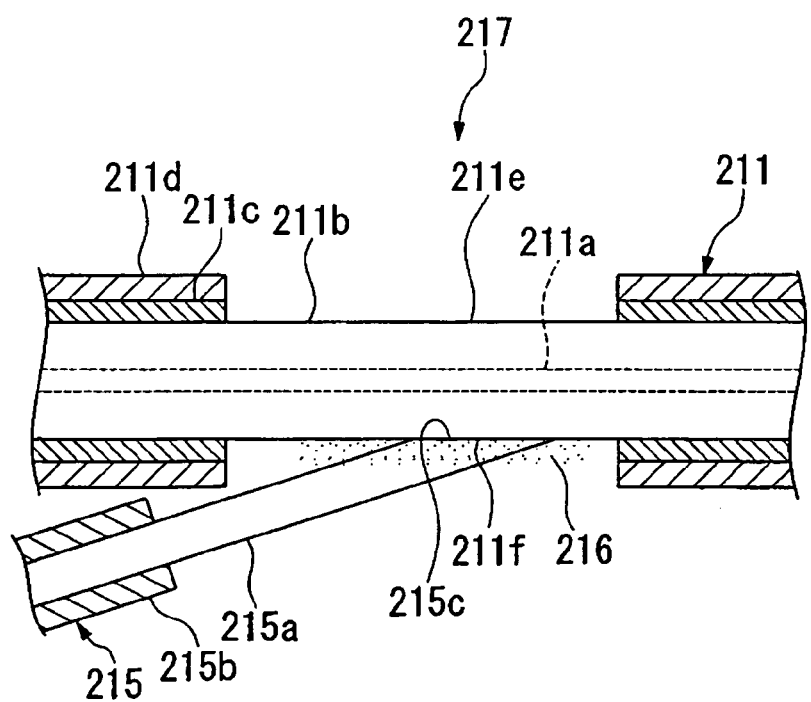
FIG. 19 is a general view for an section into which the excited light is introduced for the optical fiber laser according to a second embodiment of the present invention.

FIG. 19 is a general view for a cross section for an excited light introducing section in the optical fiber laser according to the present embodiment.

A second cladding 211c and a shock-absorbing layer 211d are removed in the excited light introducing section 217 in a longitudinal direction of the rare-earth-ion-doped fiber 211. An exposure section 211e is formed by exposing a part of a first cladding 211b. A part of the exposure section 211e is ground to form a planar surface 211f. On the other hand, the shock-absorbing layer 215b which is disposed on a tip of the guide fiber 215 is removed; thus, the tip is ground diagonally so as to form the planar surface 215c. Consequently, the planar surface 215c of the guide fiber 215 is connected to a planar surface 211f of the first cladding 211b via a bonding agent which is formed by refractive index matching agent.

As shown in FIG. 18, a plurality of the excited light introducing sections 217 are disposed on different sections on a side of the rare-earth-ion-doped fiber 211 with predetermined intervals. The interval for disposing the excited light introducing section 217 may be a length in which at least 3 dB of the excited light which is emitted so as to be incident into the rare-earth-ion-doped fiber 211 may be absorbed. It is more preferable, but not necessary, that the interval for disposing the excited light introducing section 217 should be a length in which at least 6 dB of the excited light which is emitted so as to be incident into the rare-earth-ion-doped fiber 211 may be absorbed. It is the most preferable, but not necessary, that the interval for disposing the excited light introducing section 217 should be a length in which at least 10 dB of the excited light which is emitted so as to be incident into the rare-earth-ion-doped fiber 211 may be absorbed.

If the interval for the excited light introducing section 217 is too short, the excited light which is emitted so as to be incident into a first excited light introducing section 217a in FIG. 18 leaks from a second excited light introducing section 217b which is disposed in a rear stage of the first excited light introducing section 217a in an output direction of the laser light. Therefore, in such a case, the excitation efficiency is reduced.

As shown in FIG. 19, the rare-earth-ion-doped fiber 211 is provided with a core 211a, a fist cladding 211b which is disposed around the core 211a so as to transmit the excited light, a second cladding 211c which is disposed around the first cladding 211b, and a shock-absorbing layer 211d which is disposed around the second cladding 211c. Here, it is acceptable if the shock-absorbing layer 211d is not provided.

In the rare-earth-ion-doped fiber 211 which is used in this embodiment, a diameter of the core 211a is 30 µm, a diameter of the first cladding 211b is 300 µm, and a diameter of the second cladding is 340 µm.

The core 211a is formed by a fluoride glass member into which a rare-earth-ion is doped or a silica glass member.

For such an ion for the rare-earth element, it is possible to use ytterbium (Yb), neodymium (Nd), praseodymium (Pr), thulium (Tm), erbium (Er), or holmium (Ho).

Also, the ion for the rare-earth-element is usually doped by 1000 ppm to 50000 ppm (MOL ratio).

More specifically, the core 11a is formed by a fluoride glass member into which 20000 ppm of erbium is doped.

The first cladding 211b is formed by a fluoride glass member which is similar to that in the core 211a.

The second cladding 211c is formed by a plastic member which has a refractive index which is slightly lower than that in the first cladding 211b.

For example, the refractive index in the first cladding 211b is 1.51. The refractive index in the second cladding 211c is 1.42.

Resonating mirrors 212, 213 are dielectric multi-layer mirrors in which layers which are made of titanium oxide ($TiO_2$) and layers which are made of tantalum oxide ($Ta_2O_5$) are layers alternately. The resonating mirrors 212, 213 have a function for reflecting a light which has a predetermined wavelength by a predetermined ratio.

In the present embodiment, the resonating mirror 212 reflects 100% of light which has 2.7 µm of wavelength on a surface which is connected to the rare-earth-ion-doped fiber 211. In the present embodiment, the resonating mirror 213 reflects 10% of light which has a wavelength 2.7 µm, on a surface which is connected to the rare-earth-ion-doped fiber 211.

An excited LD module 214 is an excited light source for an optical fiber laser. The excited LD module 214 is provided with eight pieces of guide fiber for introducing the excited light to thereoutside so as to output an excited light which has, for example, 982 nm of wavelength.

As shown in FIG. 19, the guide fiber 215 is provided with a core which is formed by a silica glass member so as to be disposed in the center, a plastic cladding fiber 215 which is formed around the core, and a shock-absorbing layer 215b.

In the present embodiment, the guide fiber 215 has, for example, 80 µm of core diameter and 100 µm of cladding diameter.

In the optical fiber laser according to the present embodiment, the excited light which is output from the excited LD module 214 is introduced into four introducing sections 217 for the excited light which are disposed on a side of the rare-earth-ion-doped fiber 211 in a predetermined interval via four guide fibers 215. Therefore, it is possible to output the laser light from the optical fiber laser for a long time without stopping the oscillation of the excited light in the rare-earth-doped fiber 211 under condition that any one of the excited light introducing section 217 is damaged by a heat because of a sticking dust thereto and other non-damaged excited light introducing sections 217 are connected to the rare-earth-ion-doped fiber 211 and the guide fiber 215.

If any one of the excited light introducing section 217 is damaged by a heat, the laser light output is reduced by approximately 25%. It is possible to restrict the reduction in the output if more pieces of the guide fiber 215 are disposed.

Here, four pieces of the guide fiber 215 are used in the optical fiber laser according to the present embodiment. However, the quantity for the guide fibers is not limited to such a quantity. Any quantity for the guide fiber 215 is acceptable in the present embodiment as long as there are at least two guide fibers.

Figure 20:
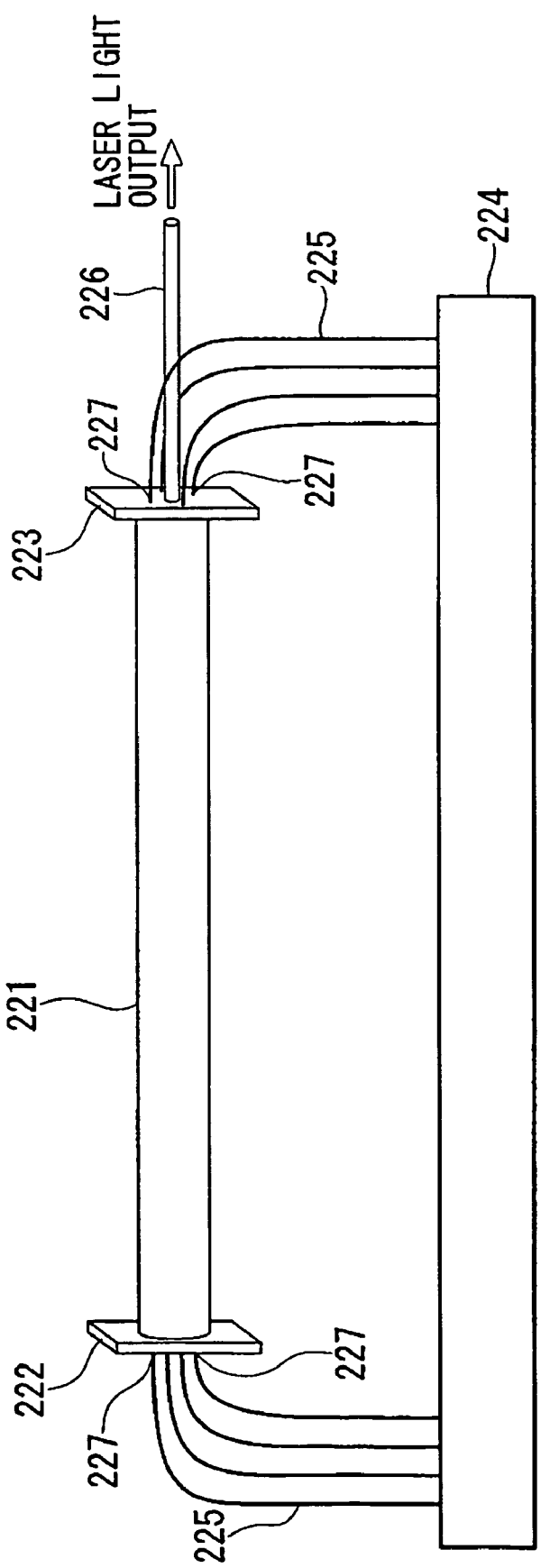
FIG. 20 is a general view for an optical fiber laser according to a third embodiment of the present invention.

FIG. 20 is a general view for showing a third embodiment of the optical fiber laser of the present invention.

In FIG. 20, reference numeral 221 indicates a rare-earth ion-doped fiber. Reference numeral 222, 223 indicate a resonating mirrors. Reference numeral 224 indicates an excited LD module. Reference numeral 225 indicates a guide fiber.

Resonating mirrors 222, and 223 are disposed on both end surfaces of the rare-earth-ion-doped fiber 221 in the optical fiber laser according to the present embodiment. Also, four guide fibers 225 extend from the excited LD module 224 such that these guide fibers 225 are connected to different sections on a side of the rare-earth-ion-doped fiber respectively with predetermined intervals. Hereinafter, a connecting section for the rare-earth-ion-doped fiber 221 and the guide fibers 225 is called as an excited light introducing section 227. The excited light is introduced from the guide fiber 225 to the rare-earth-ion-doped fiber 221 in the excited light introducing section 227. Also, a laser light outputting fiber 226 is connected on a surface of the resonating mirror 223 which is not connected to the rare-earth-ion-doped fiber 221.

Resonating mirror 222 transmit 100% of the light having a wavelenght of 0.98 μm and reflects 100% of light having a wavelength of 2.7 μm. Resonating mirror 223 transmits 100% of the light having a wavelength of 0.98 μm and reflects 10% of light having a wavelength of 2.7 μm.

Figure 21:
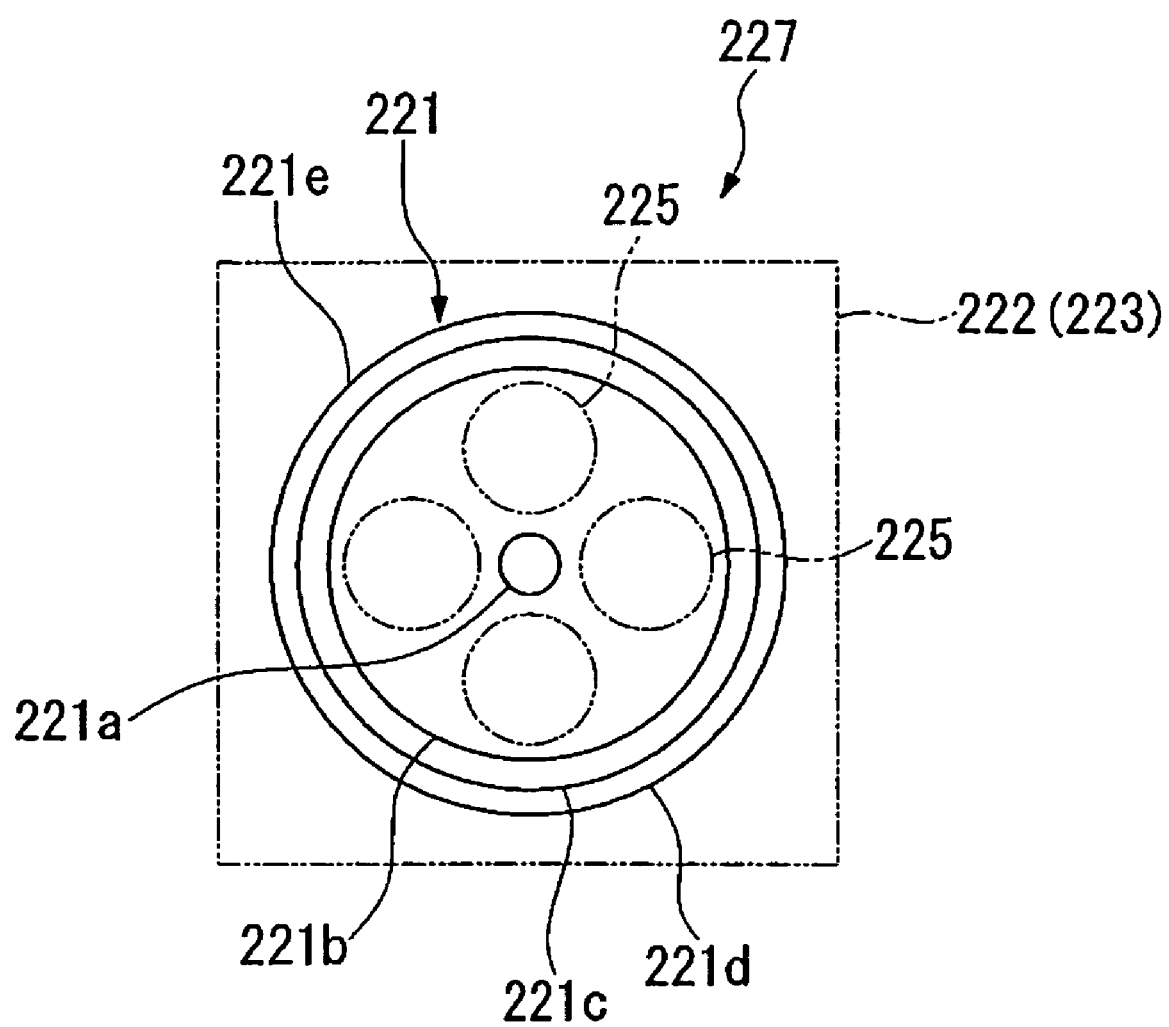
FIG. 21 is a general view for an section into which the excited light is introduced for the optical fiber laser according to a third embodiment of the present invention.
Figure 22:
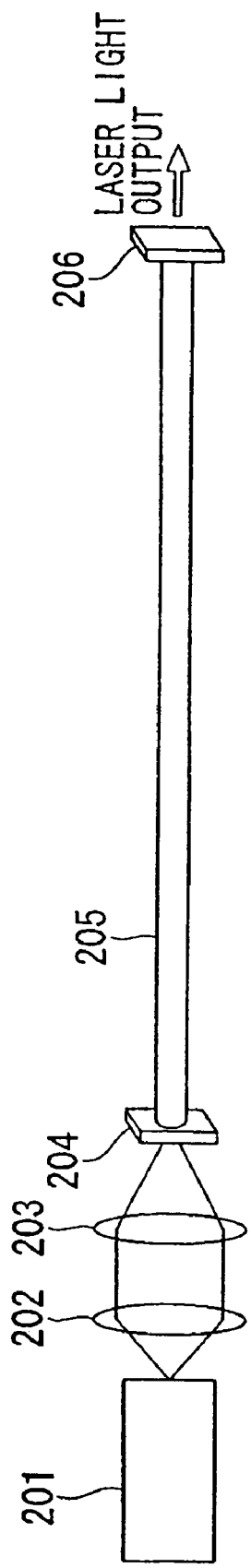
FIG. 22 is a cross section for an example for a conventional optical fiber laser.

FIG. 21 is a general view for a cross section for an excited light introducing section in the optical fiber laser according to the present embodiment.

As shown in FIG. 21, an end surface 221e of the rare-earth-ion-doped fiber 221 is connected to the resonating mirror 222 (223) in the excited light introducing section 227. Also, end surfaces of four guide fibers 225 are connected to a section which corresponds to a first cladding 221b on a surface which is not cemented to the end surface 221e of the resonating mirror 222.

By doing this, the excited light is not incident into the core 221a in a surface 221e of the rare-earth-ion-doped fiber 221 such that the excited light is incident into only the first cladding 221b.

If the excited light is incident into the core 221a, the excited light is absorbed by the rare-earth ion which is doped to the core 221a in a concentrated manner on an end surface 221e of the rare-earth-ion-doped fiber 221. The absorbed excited light is converted into a heat by a non-radiation alleviation; thus, a temperature on an end surface 221e rises. Therefore, there is a possibility in which the end surface 221e may be damaged by a heat. Also, in such a case, the core 221a is burned; thus, the resonating mirrors 222, 223 cannot work desirably. Therefore, the output for the laser light stops.

On the other hand, if the excited light is incident only into the first cladding 221b, the excited light is absorbed in a dispersed manner in a longitudinal direction of the rare-earth-ion-doped fiber 221; thus, it is possible to prevent the temperature from rising.

For example, in an erbium-ion-doped-fiber, if the excited light is incident only into the core, the excited light which has 982 nm of wavelength is absorbed by 100 dB/m. That is, a half of the excited light is absorbed in erbium in 3 cm of interval from the end surface of the incidence.

On the other hand, if the excited light is incident only into the cladding, the excited light which has 982 nm of wavelength is absorbed by 1 dB/m. That is, the quantity for the absorbed excited light is a tenth of the absorbed excited light in a case in which the excited light is incident into the core per a unit length for the excited light. Thus, it is possible to prevent the temperature from rising by absorbing the excited light. If the connecting section for the erbium-ion-doped fiber and the guide fiber is damaged by a heat, the damage does not disturb the core and the resonating mirror; therefore, the output of the laser light does not stop even if the output of the laser light may be reduced.

Members such as the rare-earth-ion-doped fiber 221, the resonating mirrors 222, 223, the excited LD module 224, and the guide fiber 225 are used which are similar to those in the above second embodiment.

In the optical fiber laser according to the present embodiment, the excited light which is emitted from the excited LD module 224 is introduced into the both end surfaces of the rare-earth-ion-doped fiber 221 via eight guide fibers 225 and the resonating mirrors 222, 223. Furthermore, the excited lights which are introduced from the guide fibers 225 respectively are connected in the rare-earth-ion-doped fiber 221 so as to be output thereoutside from the laser high output fiber 226 in a high output condition.

In the optical fiber laser according to the present embodiment, four guide fibers 225 are connected to the resonating mirrors 222, 223 independently (without interfering with each other). Therefore, the output of the excited light is divided into eight portions so as to be introduced into the rare-earth-ion-doped fiber 221 from different 4 sections in the resonating mirrors 222, 223. Therefore, even if any one of the connecting section (excited light introducing section 227) for the guide fibers 225 and the resonating mirrors 222, 223 is damaged by a heat, it is possible to output the laser light for a long time from the optical fiber laser without stopping the oscillation of the excited light in the rare-earth-ion-doped fiber 221 under condition that the other excited light introducing section 227 is connected to the rare-earth-ion-doped fiber 221 and the guide fibers 225 without being damaged by a heat.

Also, if any one of the excited light introducing sections 227 is damaged by a heat, such a damage does not disturb the other guide fibers 225; therefore, it is possible to restrict the reduction in the output of the laser light.

Here, eight pieces of the guide fiber 225 are used in the optical fiber laser according to the present embodiment. However, the quantity for the guide fibers is not limited to such a quantity. Any quantity for the guide fiber 225 is acceptable in the present embodiment as long as there are at least two guide fibers. Also, it is preferable that the excited light should be introduced from the both end surfaces of the rare-earth-ion-doped fiber 221. The present invention is not limited to such a structure. That is, it is acceptable if the excited light is incident into only one end surface.

Although the above exemplary embodiments of the present invention have been described, it will be understood by those skilled in the art that the present invention should not be limited to the described exemplary embodiments, but that various changes and modifications can be made within the spirit and scope of the present invention. Accordingly, the scope of the present invention is not limited to the described range of the following claims.

Also, it is possible to use a naked fiber, an optical fiber core, and an optical fiber for such a rare-earth-ion-doped fiber in the optical fiber laser according to the present invention.

What is claimed is:

1. A method for exciting an optical amplification medium fiber, the fiber comprising a core into which a rare-earth element is doped, an inner cladding which is disposed on an outer periphery of the core, a porous layer which is formed on an outer periphery of the inner cladding, and an outer cladding which is disposed on outer periphery of the porous layer, the method comprising:

removing a part of the outer cladding of the optical amplification medium fiber in a longitudinal direction;

forming an inner cladding exposure section in which the inner cladding is exposed;

cementing an end of an optical fiber for excited light incidence onto the outer periphery of the inner cladding which is exposed in the inner cladding exposure section; emitting excitation light from the optical fiber for optical light incidence into the optical amplification medium fiber.

2. The method for exciting the optical amplification medium fiber according to claim 1 wherein:

the optical amplification medium fiber further comprises a coating around the outer cladding: and the inner cladding exposure section is formed by removing a part of the coating and the outer cladding in a longitudinal direction.

3. The method for exciting the optical amplification medium fiber according to claim 1 wherein:

a plurality of inner cladding exposure sections are formed in the longitudinal direction of the optical amplification medium fiber;

different ends of a plurality of optical fibers for exciting light incidence are cemented to the plurality of the inner cladding exposure sections; and the excitation light is incident into the optical amplification medium fiber from the optical fibers for the excitation light incidence.

* * * * *